US012712658B2

(12) United States Patent
Zheng et al.

(10) Patent No.: US 12,712,658 B2
(45) Date of Patent: Aug. 18, 2026

(54) SERVICE DATA PROCESSING METHOD AND APPARATUS

(71) Applicant: HUAWEI TECHNOLOGIES CO., LTD., Shenzhen (CN)

(72) Inventors: Shuqian Zheng, Dongguan (CN); Xiang Liu, Hong Kong (CN); Wei Su, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 265 days.

(21) Appl. No.: 18/735,212

(22) Filed: Jun. 6, 2024

(65) Prior Publication Data

US 2024/0322934 A1 Sep. 26, 2024

Related U.S. Application Data

(63) Continuation of application No. PCT/CN2023/070351, filed on Jan. 4, 2023.

(30) Foreign Application Priority Data

Jan. 14, 2022 (CN) ......................... 202210042979.3

(51) Int. Cl.
*H04B 10/00* (2013.01)
*H04J 14/08* (2006.01)
*H04J 14/00* (2006.01)

(52) U.S. Cl.
CPC ....... *H04J 14/08* (2013.01); *H04J 2203/0091* (2013.01)

(58) Field of Classification Search
CPC .......... H04J 3/16; H04J 3/1605; H04J 3/1652; H04J 3/1664; H04B 10/27
See application file for complete search history.

(56) References Cited

U.S. PATENT DOCUMENTS

2010/0021173 A1* 1/2010 Zhang .................. H04J 3/1652 398/98
2016/0127072 A1* 5/2016 Chen ..................... H04B 10/27 398/58

FOREIGN PATENT DOCUMENTS

WO 2019213901 A1 11/2019

* cited by examiner

*Primary Examiner* — Daniel G Dobson

(57) ABSTRACT

This disclosure provides a service data processing method. The method includes: receiving service data; obtaining a processing manner for processing the service data; performing first timeslot-based multiplexing, bit width conversion, and second timeslot-based multiplexing on the service data when a bandwidth of the service data is less than a first threshold, to obtain an intermediate frame; performing single-level timeslot-based multiplexing on the service data when the bandwidth of the service data is not less than the first threshold, to obtain the intermediate frame; mapping the intermediate frame to an optical transport network (OTN) frame; and sending the OTN frame. A first bit width and a first bandwidth based on which the first timeslot-based multiplexing is performed are different from a second bit width and a second bandwidth based on which the second timeslot-based multiplexing and the single-level timeslot-based multiplexing are performed.

20 Claims, 9 Drawing Sheets

First bit width

| MFAS |
|---|
| I-PTR |
| PM |
| TCM1 |
| TCM2 |
| PT |
| C-PTR |
| TSI |
| MSI |

SERVICE DATA PROCESSING METHOD AND APPARATUS

CROSS-REFERENCE TO RELATED APPLICATIONS

This application is a continuation of International Application No. PCT/CN2023/070351, filed on Jan. 4, 2023, which claims claims priority to Chinese Patent Application No. 202210042979.3, filed on Jan. 14, 2022. The disclosures of the aforementioned applications are hereby incorporated by reference in their entireties.

TECHNICAL FIELD

This application relates to the optical communication field, and more specifically, to a service data processing method and apparatus.

BACKGROUND

A virtual container (VC) introduced by a synchronous digital hierarchy (SDH) technology is used to carry a plurality of pieces of service data of low rates (for example, 2 megabits per second (Mbps) to hundreds of Mbps). However, an optical transport network (OTN) includes optical carrier containers that are of a plurality of rates and that are used to carry a plurality of pieces of high-rate service data. For example, an optical data unit 0 (ODU0) frame is a carrier container of a minimum rate in a conventional OTN technology. The optical data unit 0 frame has a rate of about 1.25 gigabits per second (Gbps), and is used to carry Ethernet service data (for example, Ethernet service data) of 1 Gbps.

As the SDH technology gradually exits the market and the OTN technology develops, an application scope of the OTN technology extends from a backbone network to a metropolitan area network, and even to an access network. Increasing low-rate service carrying requirements are imposed on the OTN technology. Currently, an OTN low-rate service carrying method is as follows: Low-rate service data is mapped to and multiplexed into a high-rate signal, and the high-rate signal is carried by using an existing optical carrier container in the OTN. However, processing procedures for all low-rate service data are the same in the service data carrying method. This may cause problems such as poor timeliness and low bandwidth usage (for example, using a 1.25 Gbps optical carrier container to carry 2-megabit service data). Therefore, how to carry low-rate service data in an OTN while ensuring timeliness and bandwidth usage becomes an urgent problem to be resolved.

SUMMARY

Embodiments of this application provide a service data processing method. Different processing manners are used for service data whose bandwidth meets different conditions, to flexibly process the service data.

According to a first aspect, a service data processing method is provided. The method may be performed by a transmitting end device, or may be performed by a component (for example, a chip or a circuit) of the transmitting end device. This is not limited herein. The service data processing method includes: receiving service data; obtaining a first processing manner or a second processing manner for processing the service data; performing the first processing manner on the service data when a bandwidth of the service data is less than a first threshold, where the first processing manner includes: performing first timeslot-based multiplexing, bit width conversion, and second timeslot-based multiplexing on the service data to obtain an intermediate frame, where the first timeslot-based multiplexing is performing timeslot-based multiplexing on the service data based on a first bit width and a first bandwidth, to obtain a first data stream whose bit width is the first bit width, after the first data stream is obtained, the first data stream is converted into a second data stream whose bit width is a second bit width through the bit width conversion, and the second timeslot-based multiplexing is performing timeslot-based multiplexing on the second data stream based on the second bit width and a second bandwidth, to obtain the intermediate frame; performing the second processing manner on the service data when the bandwidth of the service data is not less than the first threshold, where the second processing manner includes: performing single-level timeslot-based multiplexing on the service data to obtain the intermediate frame, where the single-level timeslot-based multiplexing is performing timeslot-based multiplexing on the service data based on the second bit width and the second bandwidth, to obtain the intermediate frame; mapping, to an OTN frame, the intermediate frame that carries the service data; and sending the OTN frame, where the first threshold is greater than or equal to 50 Mbps and less than or equal to 200 Mbps, the second bit width is an integer multiple of the first bit width, and the second bandwidth is an integer multiple of the first bandwidth.

Based on the foregoing service data processing method, different processing manners (for example, two-level timeslot-based multiplexing (the first timeslot-based multiplexing, bit width conversion, and second timeslot-based multiplexing), or the single-level timeslot-based multiplexing) are used for service data whose bandwidth meets different conditions (for example, less than the first threshold, or not less than the first threshold), to flexibly process the service data.

In addition, when the two-level timeslot-based multiplexing is performed on service data whose bandwidth is less than the first threshold, the first bandwidth and the first bit width based on which the first timeslot-based multiplexing is performed are less than the second bandwidth and the second bit width based on which the second timeslot-based multiplexing is performed, so that timeliness of processing small-bandwidth service data can be ensured. However, when the single-level timeslot-based multiplexing is performed on service data whose bandwidth is not less than the first threshold, the second bandwidth and the second bit width based on which the single-level timeslot-based multiplexing is performed are greater, so that a processing process can be simplified, a processing capability of a chip can be improved, and a larger processing bandwidth can be supported.

With reference to the first aspect, in some implementations of the first aspect, the first bandwidth is less than or equal to the first threshold. The second bandwidth is greater than or equal to the first threshold. A relationship between a bandwidth based on which timeslot-based multiplexing processing is performed and the first threshold is limited, a value range of the bandwidth is specified, and relationships between different parameters are established. In this way, complexity of service data processing is reduced.

For example, a value of the first bandwidth is 10.2 Mbps, a value of the second bandwidth is 122.4 Mbps, and a value of the first threshold may also be 122.4 Mbps. In other words, values of the first threshold and the second bandwidth may be multiplexed, to further simplify a service data processing procedure.

With reference to the first aspect, in some implementations of the first aspect, the first bit width is greater than or equal to 16 bytes and less than or equal to 64 bytes. The second bit width is greater than or equal to 128 bytes.

With reference to the first aspect, in some implementations of the first aspect, the performing timeslot-based multiplexing on the service data based on a first bit width and a first bandwidth when a bandwidth of the service data is less than a first threshold, to obtain a first data stream of the first bit width includes the following processing procedures.

First, the service data is divided into one or more data code blocks (which may be denoted as data code blocks #1 for distinguishing from the following data code blocks) based on the first bit width. Then, a rate adaptation code block (which may be denoted as a rate adaptation code block #1 for distinguishing from the following rate adaptation code block) is inserted into a plurality of data code blocks #1 based on the first bandwidth, to perform rate matching to obtain a first bitstream. Further, an overhead code block (which may be denoted as an overhead code block #1 for distinguishing from the following overhead code block) is inserted into the first bitstream, to obtain a first sub-data stream of the first bandwidth. Two adjacent overhead code blocks #1 are separated by X code blocks. Finally, a plurality of first sub-data streams are multiplexed based on a timeslot, to obtain the first data stream. X is a positive integer, and sizes of the data code block #1, the rate adaptation code block #1, and the overhead code block #1 are the first bit width. The rate adaptation code block #1 and the overhead code block #1 related in a first timeslot-based multiplexing processing procedure have a same bit width size as the data code block #1, to unify data structures and simplify processing.

With reference to the first aspect, in some implementations of the first aspect, when the bandwidth of the service data is less than the first threshold, the second data stream is obtained by performing bit width conversion on the first data stream, and the second timeslot-based multiplexing is performing, based on the second bit width and the second bandwidth, timeslot-based multiplexing on the second data stream obtained through bit width conversion, to obtain the intermediate frame. The second timeslot-based multiplexing includes the following processing procedures.

First, the second data stream is divided into one or more data code blocks (which may be denoted as data code blocks #2 for distinguishing from other data code blocks in the context) based on the second bit width. Then, a rate adaptation code block (which may be denoted as a rate adaptation code block #2 for distinguishing from another rate adaptation code block in the context) is inserted into a plurality of data code blocks based on the second bandwidth, to perform rate matching to obtain a second bitstream. Further, an overhead code block (which may be denoted as an overhead code block #2 for distinguishing from another overhead code block in the context) is inserted into the second bitstream, to obtain a second sub-data stream of the second bandwidth. Two adjacent overhead code blocks are separated by X code blocks. Finally, timeslot-based multiplexing is performed based on the second sub-data stream, to obtain the intermediate frame. X is a positive integer, and sizes of the data code block #2, the rate adaptation code block #2, and the overhead code block #2 are the second bit width. The rate adaptation code block #2 and the overhead code block #2 related in a second timeslot-based multiplexing processing procedure have a same bit width size as the data code block #2, to unify data structures and simplify processing.

With reference to the first aspect, in some implementations of the first aspect, the performing timeslot-based multiplexing on the service data based on the second bit width and a second bandwidth when the bandwidth of the service data is not less than the first threshold, to obtain the intermediate frame includes the following processing procedures.

First, the service data stream is divided into one or more data code blocks (which may be denoted as data code blocks #3 for distinguishing from other data code blocks in the context) based on the second bit width. Then, a rate adaptation code block (which may be denoted as a rate adaptation code block #3 for distinguishing from another rate adaptation code block in the context) is inserted into a plurality of data code blocks based on the second bandwidth, to perform rate matching to obtain a third bitstream. Further, an overhead code block (which may be denoted as an overhead code block #3 for distinguishing from another overhead code block in the context) is inserted into the third bitstream, to obtain a third sub-data stream of the second bandwidth. Two adjacent overhead code blocks are separated by X code blocks. Finally, timeslot-based multiplexing is performed based on the third sub-data stream, to obtain the intermediate frame. X is a positive integer, and sizes of the data code block #2, the rate adaptation code block #2, and the overhead code block #2 are the second bit width. The rate adaptation code block #3 and the overhead code block #3 related in a single-level timeslot-based multiplexing processing procedure have a same bit width size as the data code block #3, to unify data structures and simplify processing.

With reference to the first aspect, in some implementations of the first aspect, a value of X includes an integer multiple of 119 or an integer multiple of 64. The value of X is limited to the integer multiple of 119 or the integer multiple of 64, so that the intermediate frame can be aligned with a payload multiframe of the OTN frame.

With reference to the first aspect, in some implementations of the first aspect, the rate adaptation code block (including the rate adaptation code block #1, the rate adaptation code block #2, and the rate adaptation code block #3 in the foregoing descriptions) includes first indication information. The first indication information indicates a next rate adaptation code block adjacent to the rate adaptation code block. Information indicating a position of the next rate adaptation code block is carried in the rate adaptation code block, and no additional information is required for indication. This reduces overheads.

With reference to the first aspect, in some implementations of the first aspect, the first indication information indicates a quantity K of data code blocks between two rate adaptation code blocks. K is a positive integer. In an implementation, the position of the next rate adaptation code block is indicated by indicating an interval. This indication manner is simple and easy to implement.

With reference to the first aspect, in some implementations of the first aspect, the method further includes: adjusting a value of K based on a watermark value of a mapping cache. The watermark value identifies a quantity of occupied storage units in the mapping cache. An interval between two rate adaptation code blocks is dynamically adjusted by using the watermark value, to improve flexibility of the solution.

With reference to the first aspect, in some implementations of the first aspect, when at least one rate adaptation code block exists between a first overhead code block and a second overhead code block, the first overhead code block includes second indication information. The second indication information indicates a position of a $1^{st}$ rate adaptation code block in the at least one rate adaptation code block relative to the first overhead code block. The first overhead code block and the second overhead code block are two adjacent overhead code blocks. The indication information is added to the overhead code block to indicate the position of the rate adaptation code block, so that the position of the $1^{st}$ rate adaptation code block in a plurality of rate adaptation code blocks is determined. This improves accuracy of the solution.

With reference to the first aspect, in some implementations of the first aspect, when the service data includes a data structure of a fixed length, and at least one boundary of the data structure exists between the first overhead code block and the second overhead code block, the first overhead code block includes third indication information. The third indication information indicates a position of a $1^{st}$ boundary in the at least one boundary relative to the first overhead code block. The first overhead code block and the second overhead code block are two adjacent overhead code blocks. The boundary of the data structure is indicated, so that a receiving end correctly restores the data structure. This improves accuracy of service data transmission.

With reference to the first aspect, in some implementations of the first aspect, the obtaining a first processing manner or a second processing manner for processing the service data includes: receiving fourth indication information, where the fourth indication information indicates the first processing manner or the second processing manner; or determining whether the bandwidth of the service data is less than the first threshold, and determining the first processing manner or the second processing manner based on a determining result. A manner of obtaining the service data processing manner may be determined by the transmitting end device, or may be determined by using an indication of another device. This improves flexibility of the solution.

With reference to the first aspect, in some implementations of the first aspect, the first data stream includes M code blocks of a size of the first bit width. The intermediate frame includes N code blocks of a size of the second bit width. N is a positive integer, and M is an integer multiple of N.

According to a second aspect, a service data processing method is provided. The method may be performed by a receiving end device, or may be performed by a component (for example, a chip or a circuit) of the receiving end device. This is not limited herein.

The service data processing method includes: receiving an OTN frame, and obtaining service data from the OTN frame. Specifically, an intermediate frame carrying the service data is mapped to the OTN frame. For a specific manner of obtaining the intermediate frame, refer to descriptions in the first aspect. For structures of an overhead code block, a data code block, and a rate adaptation code block that are included in the intermediate frame, refer to the descriptions in the first aspect. Details are not described herein again.

According to a third aspect, a service data processing apparatus is provided. The apparatus is configured to perform the method provided in the first aspect. Specifically, the service data processing apparatus may include units and/or modules configured to perform the method provided in any one of the first aspect or the foregoing implementations of the first aspect, for example, a processing unit and an obtaining unit.

In an implementation, the service data processing apparatus is a transmitting end device. The obtaining unit may be a transceiver or an input/output interface, and the processing unit may be at least one processor. Optionally, the transceiver may be a transceiver circuit. Optionally, the input/output interface may be an input/output circuit.

In another implementation, the service data processing apparatus is a chip, a chip system, or a circuit in the transmitting end device. The obtaining unit may be an input/output interface, an interface circuit, an output circuit, an input circuit, a pin, a related circuit, or the like on the chip, the chip system, or the circuit. The processing unit may be at least one processor, a processing circuit, a logic circuit, or the like.

For beneficial effects of the method shown in the third aspect and possible designs of the third aspect, refer to beneficial effects in the first aspect and possible designs of the first aspect.

According to a fourth aspect, a service data processing apparatus is provided. The apparatus is configured to perform the method provided in the second aspect. Specifically, the service data processing apparatus may include units and/or modules configured to perform the method provided in the second aspect, for example, a processing unit and an obtaining unit.

In an implementation, the service data processing apparatus is a receiving end device. The obtaining unit may be a transceiver or an input/output interface, and the processing unit may be at least one processor. Optionally, the transceiver may be a transceiver circuit. Optionally, the input/output interface may be an input/output circuit.

In another implementation, the service data processing apparatus is a chip, a chip system, or a circuit in the receiving end device. The obtaining unit may be an input/output interface, an interface circuit, an output circuit, an input circuit, a pin, a related circuit, or the like on the chip, the chip system, or the circuit. The processing unit may be at least one processor, a processing circuit, a logic circuit, or the like.

According to a fifth aspect, a processor is provided in this application, and is configured to perform the methods provided in the foregoing aspects.

Unless otherwise specified, or if operations such as sending and obtaining/receiving related to the processor do not contradict an actual function or internal logic of the processor in related descriptions, the operations may be understood as operations such as outputting, receiving, and inputting of the processor, or may be understood as sending and receiving operations performed by a radio frequency circuit and an antenna. This is not limited in this application.

According to a sixth aspect, a computer-readable storage medium is provided. The computer-readable storage medium stores program code to be executed by a device, and the program code includes the method provided in any one of the implementations of the first aspect or the second aspect.

According to a seventh aspect, a computer program product including instructions is provided. When the computer program product runs on a computer, the computer is enabled to perform the method provided in any one of the implementations of the first aspect or the second aspect.

According to an eighth aspect, a chip is provided. The chip includes a processor and a communication interface. The processor reads, by using the communication interface, instructions stored in a memory, to perform the method provided in any one of the implementations of the first aspect or the second aspect.

Optionally, in an implementation, the chip further includes the memory, the memory stores a computer program or the instructions, the processor is configured to execute the computer program or the instructions stored in the memory, and when the computer program or the instructions are executed, the processor is configured to perform the method provided in any one of the second aspect or the implementations of the second aspect.

According to a ninth aspect, a communication system is provided, including the service data processing apparatus according to the third aspect and the service data processing apparatus according to the fourth aspect.

Figures 6, 7:
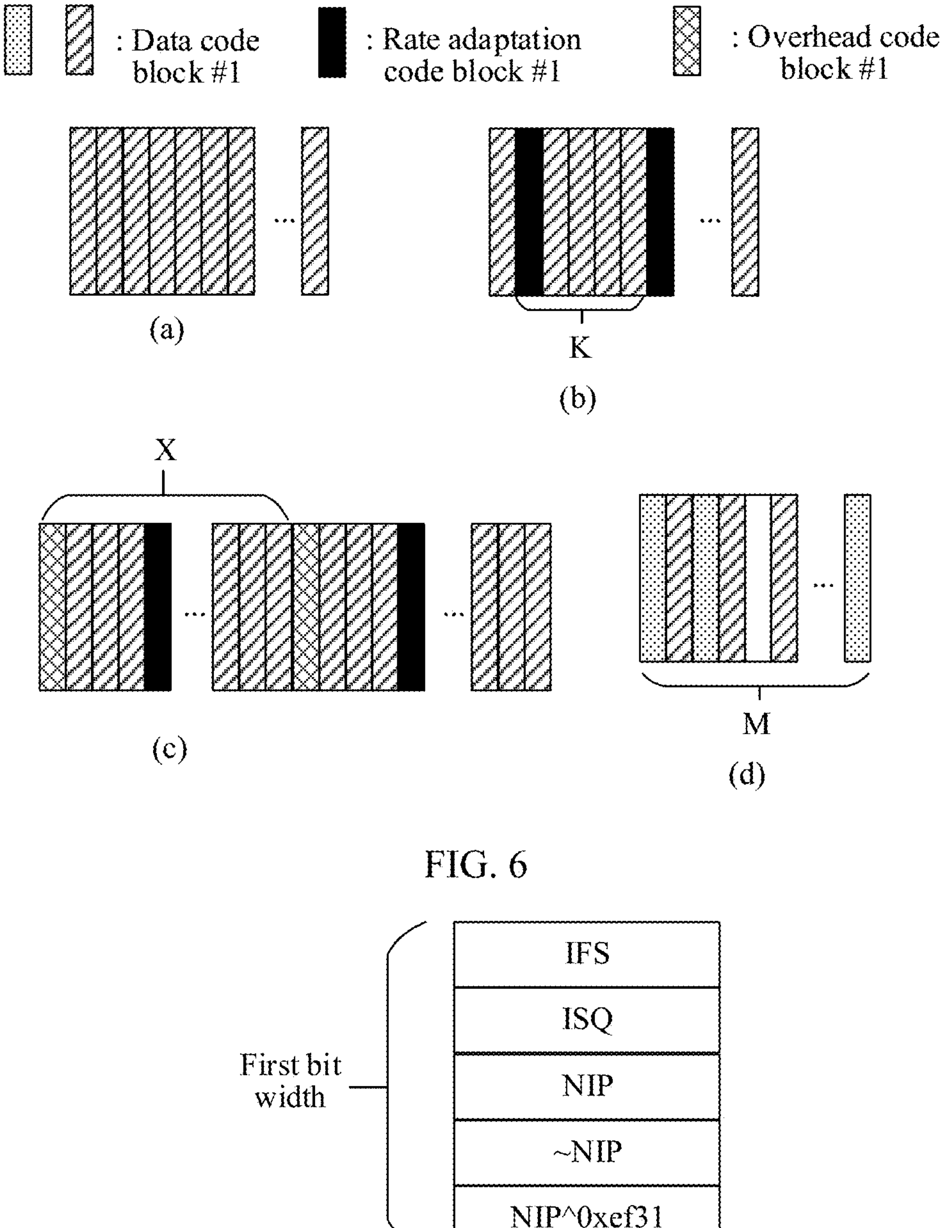
Figures 8, 9:
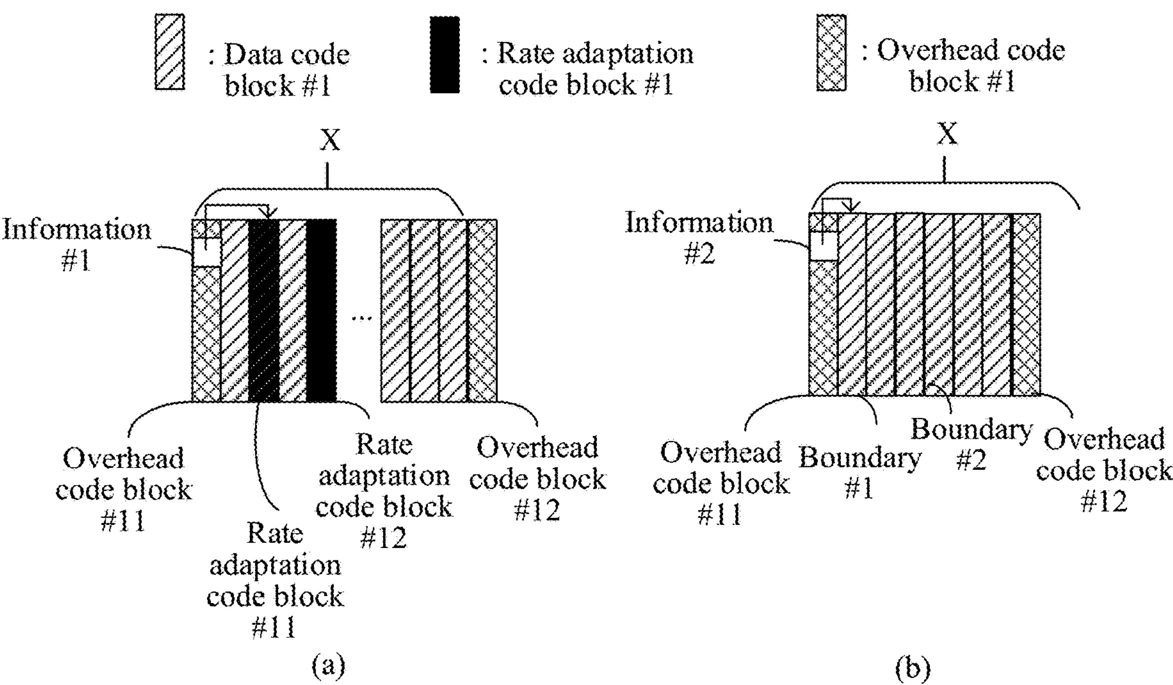
Figure 10:
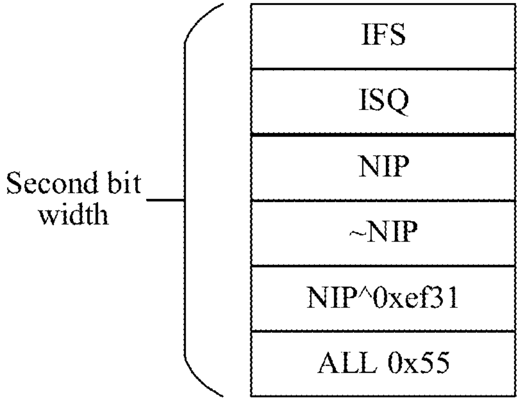
Figure 11:
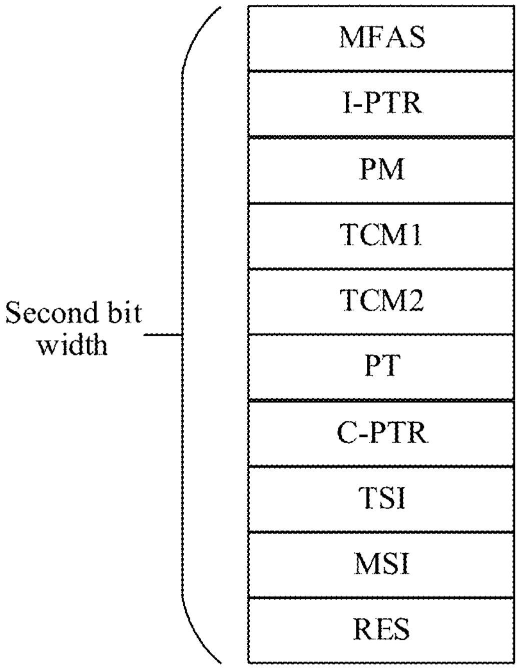
Figure 12:
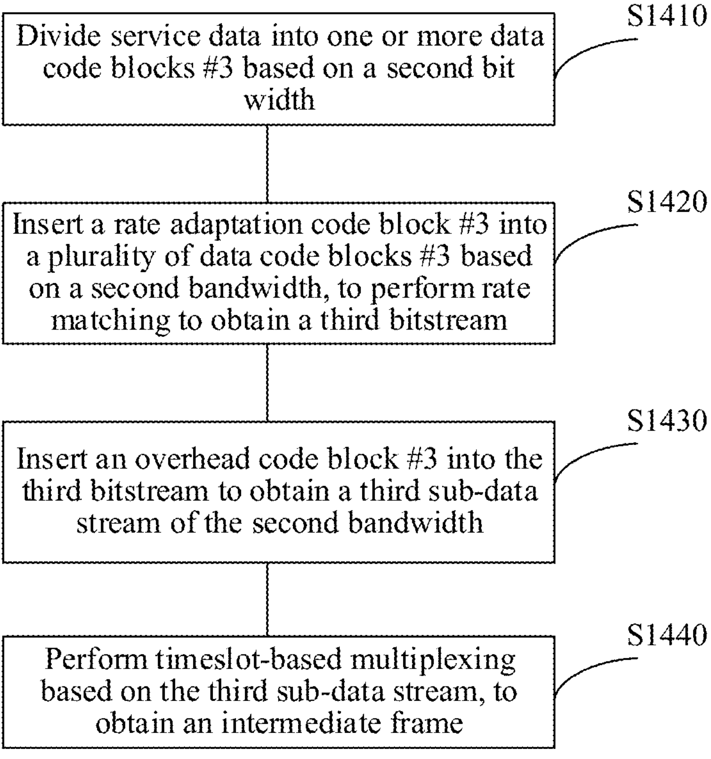
Figure 13:
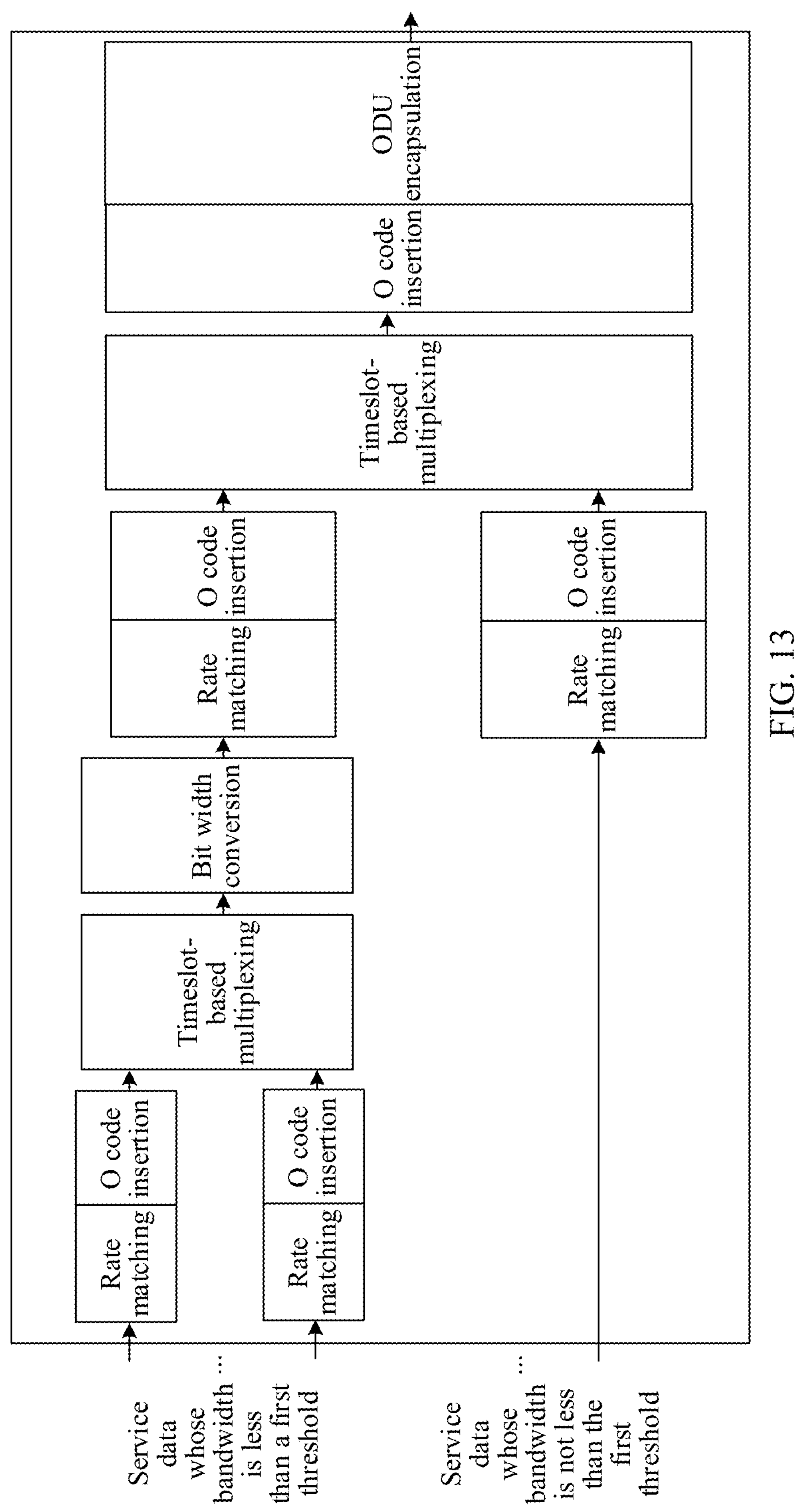
Figure 14:
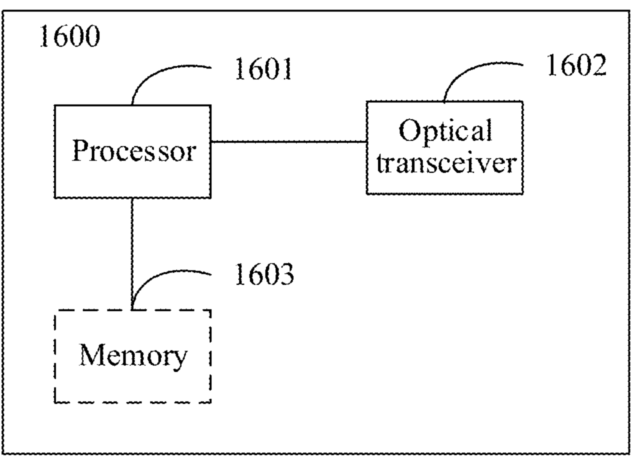

(a) to (d) in FIG. 6 are schematic diagrams of a result of a first processing manner according to an embodiment of this application;

FIG. 7 is a schematic diagram of a rate adaptation code block #1 according to an embodiment of this application;

(a) and (b) in FIG. 8 are schematic diagrams of an indication function of an overhead code block #1 according to an embodiment of this application;

FIG. 9 is a schematic diagram of an overhead code block #1 according to an embodiment of this application;

FIG. 10 is a schematic diagram of a rate adaptation code block #2 according to an embodiment of this application;

FIG. 11 is a schematic diagram of an overhead code block #2 according to an embodiment of this application;

FIG. 12 is a schematic flowchart of a second processing manner according to an embodiment of this application;

FIG. 13 is a schematic flowchart of another type of service data processing according to an embodiment of this application; and FIG. 14 is a schematic diagram of a structure of a possible network device.

DESCRIPTION OF EMBODIMENTS

The following describes technical solutions in embodiments of this application with reference to accompanying drawings.

Figure 1:
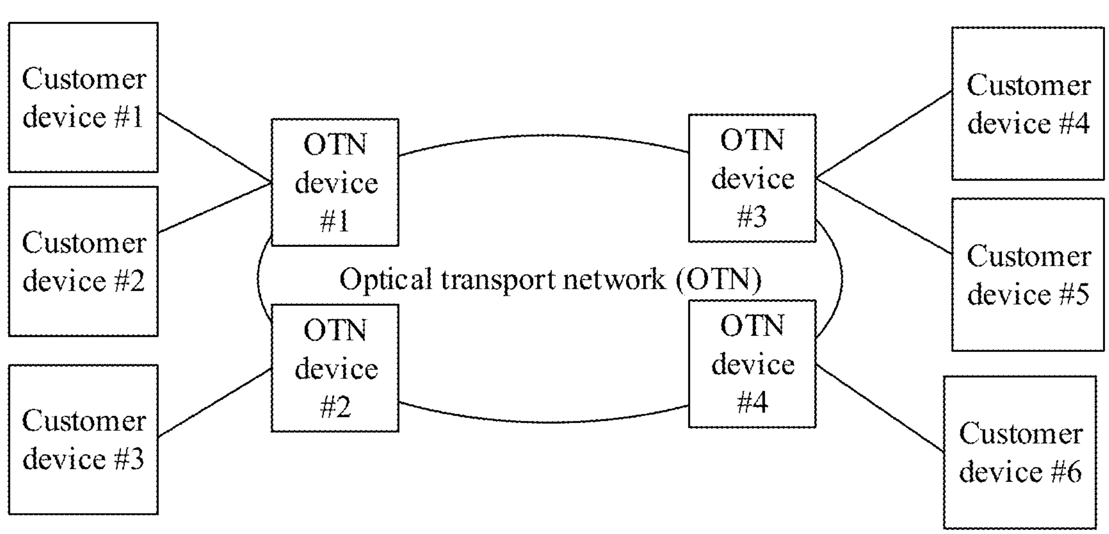
FIG. 1 is a schematic diagram of an application scenario to which this application is applicable.

FIG. 1 shows a schematic diagram of an application scenario to which this application is applicable. The technical solutions in embodiments of this application may be applied to a communication system 100 including an OTN and a plurality of customer devices (for example, a customer device #1 to a customer device #6 shown in FIG. 1). The OTN includes a plurality of interconnected OTN devices (for example, an OTN device #1 to an OTN device #4 shown in FIG. 1).

It should be noted that FIG. 1 shows only an OTN device configured to connect to a customer device. In an actual application, the OTN may further include more devices not shown in FIG. 1. In addition, FIG. 1 shows no specific connection relationship between the OTN devices. Specifically, for a connection manner between the OTN devices, refer to descriptions in a current related technology. Details are not described in this application.

It should be understood that the OTN devices in an OTN network are connected by using optical fibers, and may form, based on a specific requirement, different types of topology, for example, a linear topology, a ring topology, and a mesh topology.

For example, the customer device may also be referred to as customer premise equipment (CPE). A specific form of the customer device is not limited in this application, and the customer device includes but is not limited to a terminal configured to communicate with the OTN device. The terminal may also be referred to as a terminal device, an access terminal, a subscriber unit, a subscriber station, a mobile station, a mobile device, a wireless communication device, a user agent, or a user apparatus. The customer device may be a device having service data to be transmitted.

One OTN device may have different functions. Usually, the OTN devices are classified into optical-layer devices, electrical-layer devices, and optical-electrical hybrid devices. The optical-layer device is a device that can process an optical-layer signal, for example, an optical amplifier (OA) or an optical add-drop multiplexer (OADM). The OA may also be referred to as an optical line amplifier (OLA), and is mainly configured to amplify an optical signal, to support transmission of the optical signal over a longer distance while ensuring specific performance of the optical signal. The OADM is configured to perform space conversion on the optical signal, so that the optical signal can be output from different output ports (sometimes also referred to as directions). Based on different capabilities, the OADM may be classified into a fixed OADM (FOADM) and a reconfigurable OADM (ROADM). The electrical-layer device is a device that can process an electrical-layer signal, for example, a device that can process an OTN electrical signal. The optical-electrical hybrid device is a device that can process optical-layer and electrical-layer signals.

It should be noted that one OTN device may integrate a plurality of different functions based on a specific integration requirement. The technical solutions provided in this application are applicable to OTN devices of different forms and integration levels, and in particular, to the OTN device configured to connect to the customer device.

Figure 2:
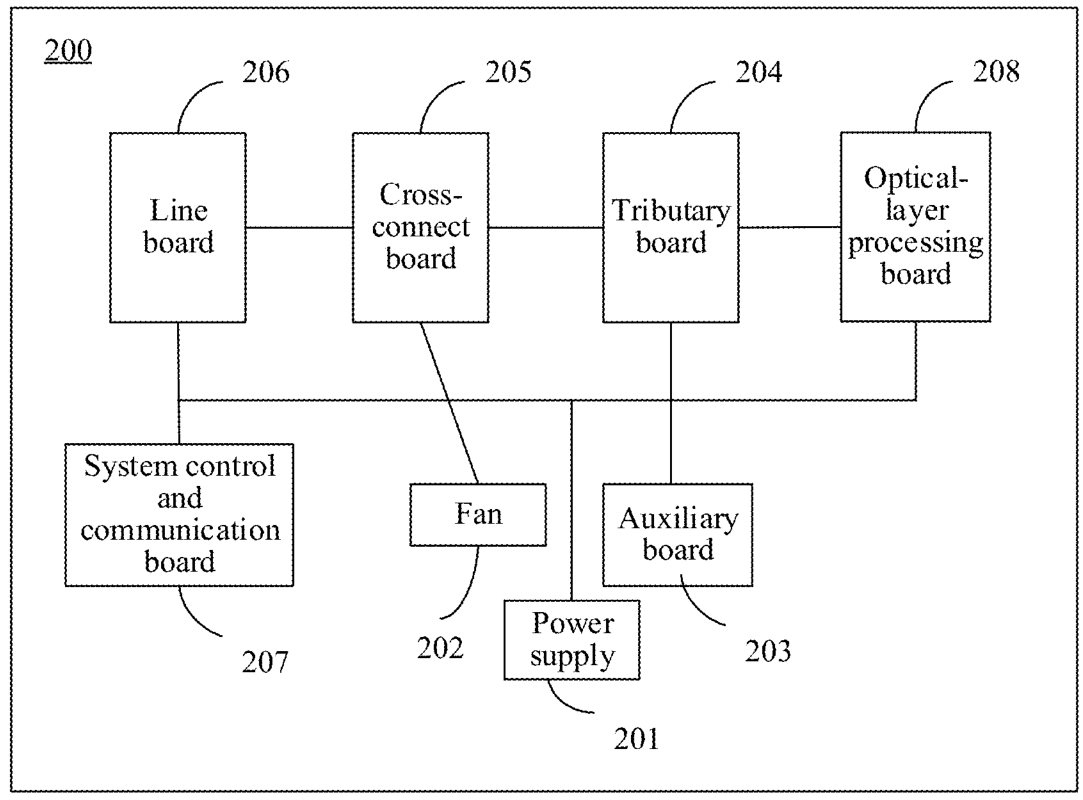
FIG. 2 is a schematic diagram of a structure of an optical transport device.

FIG. 2 is a schematic diagram of a structure of an optical transport device. For example, the optical transport device shown in FIG. 2 is one of the OTN device #1 to the OTN device #4 in FIG. 1. It can be learned with reference to FIG. 2 that an OTN device 200 includes a power supply 201, a fan 202, and an auxiliary board 203, and may further include a tributary board 204, a line board 206, a cross-connect board 205, an optical processing board 208, and a system control and communication board 207.

It should be noted that types and quantities of boards included in each device may be different based on a specific requirement. For example, a network device serving as a core node may not have the tributary board 204. For another example, a network device serving as an edge node may have a plurality of tributary boards 204. The power supply 201 is configured to supply power to the OTN device 200, and may include an active power supply and a standby power supply. The fan 202 is configured to dissipate heat for the device. The auxiliary board 203 is configured to provide an auxiliary function such as providing an external alarm or accessing an external clock. The tributary board 204, the cross-connect board 205, and the line board 206 are mainly configured to process an OTN electrical-layer signal.

The tributary board 204 is configured to implement receiving and sending of various customer services, for example, an SDH service, a packet service, an Ethernet service, and a fronthaul service. Further, the tributary board 204 may be divided into a customer-side optical module and a signal processor. The customer-side optical module may be an optical transceiver, configured to receive and/or send service data. The signal processor is configured to map service data to a data frame and demap the service data from the data frame. The cross-connect board 205 is configured to implement data frame switching, and complete switching of one or more types of data frames. The line board 206 mainly implements processing on a line-side data frame.

The line board 206 may be divided into a line-side optical module and a signal processor. The line-side optical module may be a line-side optical transceiver, configured to receive and/or send a data frame. The signal processor is configured to implement multiplexing and demultiplexing, or mapping and demapping on the line-side data frame.

The system control and communication board 207 is configured to implement system control and communication. Specifically, the system control and communication board 207 may collect information from different boards by using a backplane, or send control instructions to a corresponding board.

It should be noted that, unless otherwise specified, there may be one or more specific components (for example, a signal processor). This is not limited in this application. It should be further noted that FIG. 2 merely provides an example of a possible structure of an OTN device, and does not constitute any limitation on the protection scope of this application. The structure of the OTN device is not limited in this application, and the OTN device may be an existing OTN device or an OTN device after an OTN is developed in the future.

It should be understood that the method provided in embodiments of this application may be applied to an optical transport network, for example, the communication system shown in FIG. 1. However, a scenario to which the method can be applied is not limited in embodiments of this application. For example, the method is also applicable to another communication system including a device (for example, an OTN device or another communication device) that can implement a corresponding function.

For ease of understanding the technical solutions in embodiments of this application, some terms or concepts that may be used in embodiments of this application are first briefly described.

1. OTN frame: The OTN frame is a data frame structure used by the OTN device. The OTN frame may also be referred to as an OTN transmission frame. The OTN frame is configured to carry various service data and provide rich management and monitoring functions. The OTN frame may be a flexible optical service unit (OSUflex) frame, and OSUflex may also be referred to as an OSU frame for short. Alternatively, the OTN frame may be ODUk, ODUCn, ODUflex, OTUK, OTUCn, a flexible OTN (FlexO) frame, or the like.

A difference between an ODU frame and an OTU frame lies in that the OTU frame includes the ODU frame and an OTU overhead; k represents different rate levels, for example, that k=1 represents 2.5 Gbps, and that k=4 represents 100 Gbps; and Cn represents a variable rate, and is a rate that is a positive integer multiple of 100 Gbps. Unless otherwise specified, the ODU frame refers to any one of ODUk, ODUCn, or ODUflex, and the OTU frame refers to any one of OTUk, OTUCn, or FlexO.

It should be further noted that, with development of an OTN technology, a new type of OTN frame may be defined, which is also applicable to this application.

2. OTN frame structure: The OTN frame structure is a structure of four rows and a plurality of columns, and includes an overhead area, a payload area, and a forward error correction (FEC) area. Specifically, for the OTN frame structure, refer to related descriptions in a current protocol. Details are not described herein again. The payload area of the OTN frame is divided into a plurality of payload blocks (Payload Blocks, PBs). Each PB occupies a position of a fixed length (also referred to as a size) in the payload area, for example, 128 bytes. For example, overheads that may be included in the OTN frame are shown in the following Table 1.

TABLE 1

Example of the overheads that may be carried in the OTN frame

| Name | Description |
|---|---|
| FAS | The frame alignment signal (AS) is used for frame alignment, where specifically, the FAS may be set to a fixed value, for example, 4-byte “0xF6F62828”. |
| TTI | The trail trace identifier (TTI) is used to place trail trace information of a frame. |
| BEI | The backward error indication (BEI) indicates whether a bit error exists in a trail in a receiving direction. |
| BDI | The backward defect indication (BDI) indicates whether the trail in the receiving direction is faulty. |
| STAT | The status indication (Status) identifies trail status information, for example, an alarm indication signal or an idle signal indication transmitted to a downstream direction. |
| PM | The path monitoring (PM) is used to complete an end-to-end path monitoring function of a frame, and may include one or more of the TTI, BIP, the BEI, the BDI, and the STAT. |
| SM | The section monitoring (SM) overhead is used to complete a section monitoring function. |
| TCM | The tandem connection monitoring (TCM) overhead is used to complete a tandem connection monitoring function of a frame. |
| PT | The payload type (PT) indicates a mapping manner currently used to map service data to the OSU frame, and/or a type of a service currently carried in a frame. |
| DM | The delay measurement DM) is used to provide an end-to-end delay measurement function of a frame. |
| APS | The automatic protection switching (APS) is used to provide an automatic protection switching function of a frame. |

TABLE 1-continued

| Example of the overheads that may be carried in the OTN frame | |
|---|---|
| Name | Description |
| GCC | The general communication channel GCC) is used to provide a function of a general communication channel. |
| RES | Reserved bit (reserved for future international standardization) |

It should be understood that the foregoing description of the OTN frame structure is merely an example. Another deformed OTN frame is also applicable to this application. For example, the another deformed OTN frame is an OTN frame that does not include an FEC area. For another example, the another deformed OTN frame is a frame structure whose quantities of rows and columns are different from that of an OTN frame. It should be understood that the PB may also be referred to as a timeslot, a timeslot block, a time slice, or the like. A name of the PB is not limited in this application.

3. Multiplexing a low-rate service into a high-rate signal: When a 100 M Ethernet (fast Ethernet, FE) needs to be transmitted by using the OTN, the FE is first mapped to an ODU0 frame with a rate of about 1.25 Gbps, and then is transmitted in the OTN by using OTU1. In this way, transmission efficiency is low, and bandwidth usage of ODU0 is less than 10%. For ease of understanding, a transmission manner of a low-rate service is described with reference to FIG. 3.

Figure 3:
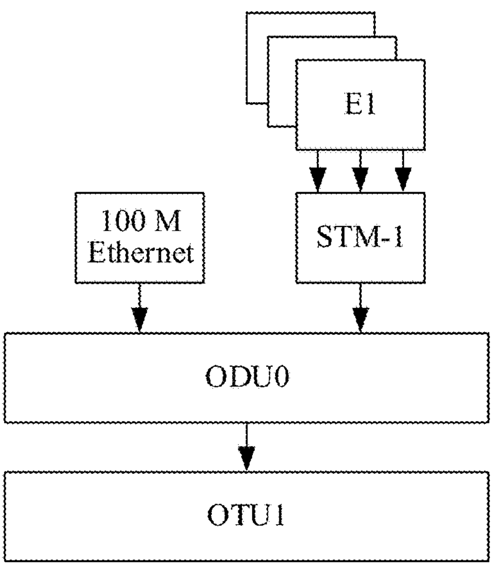
FIG. 3 is a schematic diagram of multiplexing a low-rate service into a high-rate signal according to an embodiment of this application.

FIG. 3 is a schematic diagram of multiplexing a low-rate service into a high-rate signal according to this application. It can be learned from FIG. 3 that a plurality of E1 signals are first mapped to a synchronous transport module-1 (synchronous transport module-1, STM-1) interface signal. STM-1 is a type of SDH signal. The STM-1 signal is mapped to ODU0 and then transmitted in an OTN by using OTU1.

In the following, the multiplexing a low-rate service into a high-rate signal may also be referred to as signal "multiplexing", which may be understood as multiplexing a plurality of signals into a complete OTN signal based on corresponding timeslot arrangements.

The ITU-T G.709 standard also defines a method for asynchronously mapping an ODUj signal to an ODTUjk signal and a method for multiplexing the ODTUjk signal to an OPUk signal. The following uses an example in which four channels of ODU0 signals are asynchronously mapped to and multiplexed into an OTU5G signal to briefly describe the method for asynchronously mapping the ODUj signal to the ODTUjk signal.

The ODU0 signals that belong to different clock domains first need to generate adjustment bytes through rate matching, to form an ODTU0x frame. A structure of the frame is as follows: 952 columns×16 (4×4) rows and 1 column of adjustment overhead JOH. Columns 473 to 476 of the ODTU0x frame are fixed filling columns. The ODTU0x frame includes one adjusted ODU0 frame, a two-byte positive adjustment position, and a one-byte negative adjustment position. NJO in the adjustment overhead JOH is a negative adjustment byte, PJO1 and PJO2 in the same row as NJO are two positive adjustment bytes.

After the ODTU0x frame is formed, four channels of ODTU0x frames need to be multiplexed into OPU5G through byte interleaving, to finally form the OTU5G signal, and transmission and management are performed on the OTU5G signal in a network.

4. Watermark (watermark): It indicates a depth of use (or a count value of use) of a cache queue. A larger watermark indicates that more space is used. An increasing watermark indicates that a write rate into the cache queue is greater than a read rate. A decreasing watermark indicates that the write rate is less than the read rate.

The foregoing describes, with reference to FIG. 1, a scenario to which embodiments of this application can be applied, briefly describes, with reference to FIG. 3, defects existing in current carrying of a low-rate service in the OTN, and further briefly describes basic concepts in this application. The following describes in detail a service data processing method provided in this application with reference to the accompanying drawings.

A specific structure of an execution body of the method provided in embodiments of this application is not particularly limited in the following embodiments, provided that a program that records code of the method provided in embodiments of this application can be run to perform communication according to the method provided in embodiments of this application. For example, the execution body of the method provided in embodiments of this application may be the OTN device, a functional module that can invoke and execute a program in the OTN device, or another communication device.

For ease of understanding embodiments of this application, the following descriptions are provided.

First, in this application, "indicating" may include "directly indicating" and "indirectly indicating". When a piece of information is described as indicating A, the information may directly indicate A or indirectly indicate A, but it does not necessarily indicate that the information carries A.

Second, "a plurality of" means two or more than two. "And/or" describes an association relationship between associated objects, and three relationships may exist. For example, A and/or B may indicate three cases: Only A exists, both A and B exist, and only B exists. In addition, in the descriptions of this application, terms such as "first", "second", and various numbers (for example, "#1" and "#2") are merely used for distinguishing and describing, for example, distinguishing between different OTN devices, and cannot be understood as an indication or implication of relative importance or an indication or implication of an order. It should be understood that the objects described in this way are interchangeable in a proper circumstance, so that a solution other than embodiments of this application can be described.

Third, the "protocol" in embodiments of this application may be a standard protocol in the OTN field, for example, an ITU-T G.709 standard protocol and a related protocol applied to a future OTN system. This is not limited in this application.

Fourth, "being stored" in embodiments of this application may be "being stored in one or more memories". The one or more memories may be separately disposed, or may be integrated into an encoder, a decoder, a processor, or a communication apparatus. Alternatively, a part of the one or more memories may be separately disposed, and a part of the one or more memories are integrated into the decoder, the processor, or the communication apparatus. A type of the memory may be a storage medium in any form.

Fifth, in embodiments of this application, a value of a parameter is an integer multiple of a value of another parameter. This indicates that the value of the parameter is at least twice the value of the another parameter. For example, the value of the parameter=W*the value of the another parameter, where W is an integer greater than or equal to 2.

Sixth, unless otherwise specified, specific descriptions of some technical features in one embodiment may also be applied to explain corresponding technical features mentioned in another embodiment. For example, a specific description of a timeslot-based multiplexing procedure in an embodiment may be applied to another embodiment, and details may not be described in the another embodiment.

Figure 4:
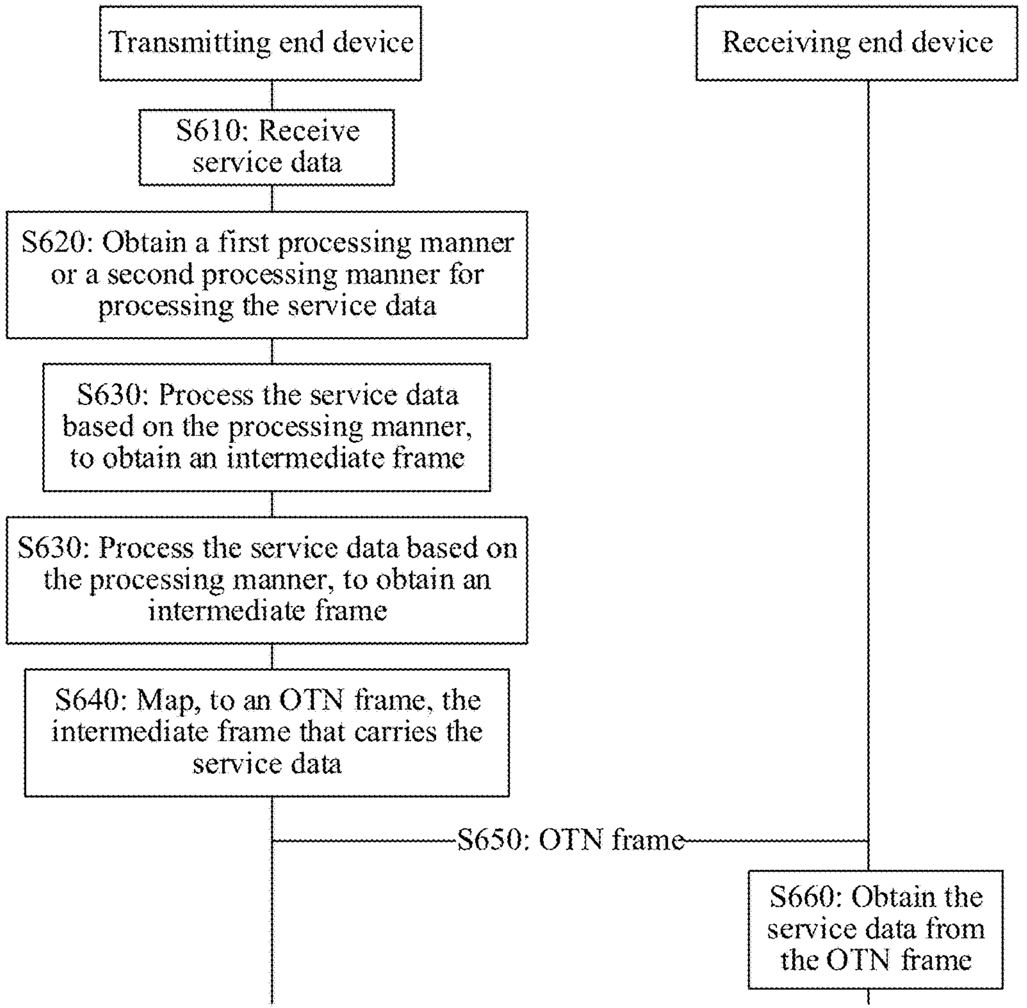
FIG. 4 is a schematic flowchart of a service data processing method according to an embodiment of this application.

FIG. 4 is a schematic flowchart of a service data processing method according to this application. The method includes the following steps.

S610: A transmitting end device receives service data.

For example, the transmitting end device is the foregoing OTN device (for example, the OTN device #1 shown in FIG. 1), and receives the service data from a customer device (for example, the customer device #1 or the customer device #2 shown in FIG. 1). Alternatively, the transmitting end device is another device that can implement the OTN device. A specific form of the transmitting end device is not limited in embodiments of this application, provided that a corresponding service data processing function can be implemented.

For example, the service data in embodiments of this application refers to a service that can be carried by an optical transport network. The service includes but is not limited to an Ethernet service, a packet service, a wireless backhaul service, and the like. It should be understood that a type of the service data is not limited in embodiments of this application.

After the transmitting end device receives the service data, or when the transmitting end device receives the service data, the transmitting end device obtains a processing manner for processing the service data. A method procedure shown in FIG. 4 further includes the following step. S620: The transmitting end device obtains a first processing manner or a second processing manner for processing the service data.

In a possible implementation, the transmitting end device may determine, based on a size of a bandwidth (or a rate) of the received service data, that the processing manner for processing the service data is the first processing manner or the second processing manner.

For example, after receiving the service data, the transmitting end device determines whether the bandwidth of the service data is less than a first threshold, and determines, based on a determining result, the processing manner for processing the service data. When the bandwidth of the service data is less than the first threshold (where the service data may be referred to as small-bandwidth service data), it is determined that the processing manner for processing the service data is the first processing manner. When the bandwidth of the service data is not less than the first threshold (where the service data may be referred to as large-bandwidth service data), it is determined that the processing manner for processing the service data is the second processing manner.

In another possible implementation, the transmitting end device may determine, based on received fourth indication information, the processing manner for processing the service data.

Specifically, the fourth indication information indicates that the processing manner of the service data is the first processing manner or the second processing manner.

For example, when the bandwidth of the service data is less than the first threshold, a network management device determines that the processing manner for processing the service data is the first processing manner, and notifies, by using the fourth indication information, the transmitting end device that the processing manner is the first processing manner. When the bandwidth of the service data is not less than the first threshold, the network management device determines that the processing manner for processing the service data is the second processing manner, and notifies, by using the fourth indication information, the transmitting end device that the processing manner is the second processing manner.

For example, the transmitting end device may receive the service data and the fourth indication information at the same time, or the transmitting end device may receive the service data and the fourth indication information in sequence.

For example, the first threshold may be predetermined in a protocol; the first threshold is determined by the transmitting end device; or the first threshold may be determined by the transmitting end device through negotiation with a device that provides the service data.

It should be noted that a manner of determining the first threshold is not limited in embodiments of this application, provided that the processing manner of the service data can be determined based on the existing first threshold.

In a possible implementation, a value of the first threshold may be 100 Mbps, indicating that service data whose bandwidth is less than 100 Mbps is processed in the first processing manner, and service data whose bandwidth is not less than (for example, greater than or equal to) 100 Mbps is processed in the second processing manner. In another possible implementation, a value of the first threshold may be 10 Mbps, indicating that service data whose bandwidth is less than 10 Mbps is processed in the first processing manner, and service data whose bandwidth is not less than (for example, greater than or equal to) 10 Mbps is processed in the second processing manner.

The first processing manner is different from the second processing manner, and details are described below. Details are not described herein again.

It should be understood that the value of the first threshold being 100 Mbps or 10 Mbps is merely an example for describing possible values of the first threshold for ease of understanding of this application, and does not constitute any limitation on the protection scope of this application. The first threshold may alternatively be another value. Examples are not described one by one herein.

By way of example and not limitation, a value range of the first threshold in this application may be greater than or equal to 50 megabits per second Mbps and less than or equal to 200 Mbps (for example, 50 Mbps Mbps≤the first threshold≤200 Mbps).

It can be learned from the foregoing that to-be-processed service data is classified into two types by using the first threshold, and the two types of service data each are processed in a different processing manner.

In addition, it should be noted that, an extension example of the foregoing example in which the to-be-processed service data is classified into two types based on the first threshold may be obtained through simple derivation: classifying the to-be-processed service data into three types based on the first threshold and a second threshold, and processing each of the three types of service data in a different processing manner.

For example, the value of the first threshold may be 100 Mbps, and a value of the second threshold may be 1 Gbps. When the bandwidth of the service data is less than the first threshold (for example, the bandwidth of the service data<the first threshold), the service data is processed in the first processing manner. When the bandwidth of the service data is between the first threshold and the second threshold (for example, the first threshold≤the bandwidth of the service data≤the second threshold), the service data is processed in the second processing manner. When the bandwidth of the service data is greater than the second threshold (for example, the bandwidth of the service data>the second threshold), the service data is processed in a third processing manner. The first processing manner, the second processing manner, and the third processing manner are different.

Alternatively, the to-be-processed service data may be classified into more than three types by using a plurality of threshold limits, and different types of service data each are processed in a different processing manner. Examples are not described one by one herein.

It should be understood that, for classifying the to-be-processed service data into at least two types, and processing each piece of different service data in a different processing manner, refer to the descriptions of classifying the to-be-processed service data into two types.

For ease of description, in the following, whether the bandwidth of the service data is less than the first threshold is used as an example for description. The first processing manner is used for service data whose bandwidth is less than the first threshold, and the second processing manner is used for service data whose bandwidth is not less than the first threshold.

Specifically, after receiving the service data and obtaining the processing manner for processing the service data, the transmitting end device processes the service data based on the processing manner, to obtain an intermediate frame. The method procedure shown in FIG. 4 further includes the following step. S630: The transmitting end device processes the service data based on the processing manner, to obtain the intermediate frame.

It can be learned from the foregoing that service data whose bandwidth meets different conditions corresponds to different processing manners. Specifically, the following two manners are included.

First processing manner: When the bandwidth of the service data is less than the first threshold, first timeslot-based multiplexing, bit width conversion, and second timeslot-based multiplexing are performed on the service data to obtain the intermediate frame. The first timeslot-based multiplexing is performing timeslot-based multiplexing on the service data based on a first bit width and a first bandwidth, to obtain a first data stream of the first bit width, the bit width conversion is converting the first data stream into a second data stream of a second bit width, and the second timeslot-based multiplexing is performing timeslot-based multiplexing on the second data stream based on the second bit width and a second bandwidth, to obtain the intermediate frame.

In the first processing manner, the to-be-mapped intermediate frame (also referred to as a bitstream, a data stream, a data structure, or the like) is obtained by performing two-level timeslot-based multiplexing. The following describes the first processing manner in detail with reference to FIG. 5. Details are not described herein again.

Second processing manner: When the bandwidth of the service data is not less than the first threshold, single-level timeslot-based multiplexing is performed on the service data to obtain the intermediate frame. The single-level timeslot-based multiplexing is performing timeslot-based multiplexing on the service data based on a second bit width and a second bandwidth, to obtain the intermediate frame.

In the second processing manner, the to-be-mapped intermediate frame (also referred to as a bitstream, a data stream, a data structure, or the like) is obtained by performing single-level timeslot-based multiplexing. The following describes the second processing manner in detail with reference to FIG. 12. Details are not described herein again.

Further, after the intermediate frame is obtained, the intermediate frame that carries the service data is mapped to an OTN frame. The method procedure shown in FIG. 4 further includes the following step. S640: The transmitting end device maps, to the OTN frame, the intermediate frame that carries the service data.

Specifically, the intermediate frame includes control information (which may be referred to as an overhead (overhead, OH) code block, an O code for short), service data (which may be referred to as a data (data) code block, a D code for short), and a rate adaptation code block (an idle (idle) code block, an I code for short), and is uniformly encapsulated into a payload area of the OTN frame in a block-by-block sequence in a unit of a code block. In addition, one piece of first frame header position indication information (an OPTR) of the intermediate frame is inserted into row 1 and columns 15 and 16 in a payload overhead area of the OTN frame, to indicate a position of the first O code in the OTN frame.

It should be noted that, when a processing procedure of small-bandwidth service data and a processing procedure of large-bandwidth service data are separately described below with reference to FIG. 5 and FIG. 12, the overhead code block, the data code block, and the rate adaptation code block are described in detail. Details are not described herein.

After the intermediate frame is mapped to the OTN frame, the OTN frame may be sent to a receiving end device. The method procedure shown in FIG. 4 further includes the following step. S650: The transmitting end device sends the OTN frame to the receiving end device, or the receiving end device receives the OTN frame from the transmitting end device.

Specifically, it can be learned from the foregoing that the OTN frame is used to carry the intermediate frame that carries the service data, and the intermediate frame is obtained by processing the service data in a processing manner. The foregoing has described in detail processing manners corresponding to different service data, and details are not described herein again.

After receiving the OTN frame, the receiving end device needs to restore the service data. The method procedure shown in FIG. 4 further includes the following step. S660: The receiving end device obtains the service data from the OTN frame.

Specifically, after receiving the OTN frame, the receiving end device obtains, based on the OPTR in the row 1 and the columns 15 and 16 in the payload overhead area of the OTN frame and an interval (X) between O codes, positions of all the O codes included in the intermediate frame, and restores the intermediate frame block by block based on position information of all the O codes. Further, the receiving end device deletes the rate adaptation code block in the intermediate frame based on an I-PTR in each O code. Then, the receiving end device determines, based on a C-PTR indication in the O code, a position of the 1st code block of the 1st sub-data stream in a plurality of sub-data streams included in the intermediate frame. Finally, the receiving end device obtains, based on MSI information in each O code, mapping relationships between code blocks in different sub-data streams and a service (for example, a code block position occupied by a piece of service data), and performs timeslot demultiplexing on the plurality of sub-data streams, to obtain a plurality of pieces of service data.

It should be noted that, in embodiments of this application, how the receiving end device restores the service data from the received OTN frame is not limited. For details, refer to descriptions of timeslot demultiplexing in a current related technology. Details are not described herein again.

In FIG. 4, a service data transmission process is described in detail, and that the service data whose bandwidth is less than the first threshold may be processed in the first processing manner is described. The following describes in detail a processing procedure of the first processing manner with reference to FIG. 5. FIG. 5 is a schematic flowchart of the first processing manner according to this application. In addition, for ease of understanding, each step in the first processing manner is described with reference to (a) to (d) in FIG. 6. (a) to (d) in FIG. 6 are schematic diagrams of a result of the first processing manner according to this application. FIG. 5 includes the following steps.

S710: Divide service data into one or more data code blocks #1 based on a first bit width.

Specifically, the service data is sliced into the one or more data code blocks #1 of a size of the first bit width, as shown in (a) in FIG. 6. It can be learned from (a) in FIG. 6 that the service data is sliced into a plurality of data code blocks #1 (for example, the plurality of data code blocks #1 included as shown in (a) in FIG. 6), and a size of each data code block #1 is the first bit width.

For example, the first bit width is greater than or equal to 16 bytes and less than or equal to 64 bytes.

For example, the first bit width is 16 bytes (bytes), or the first bit width is 32 bytes.

S720: Insert a rate adaptation code block #1 into the plurality of data code blocks #1 based on a first bandwidth, to perform rate matching to obtain a first bitstream.

Specifically, when the service data is sliced into the plurality of data code blocks #1 of the size of the first bit width, the rate adaptation code block #1 is inserted into the plurality of data code blocks #1 to implement rate matching, as shown in (b) in FIG. 6.

It can be learned from (b) in FIG. 6 that one or more rate adaptation code blocks #1 are inserted into the plurality of data code blocks #1, and there are K code blocks between two adjacent rate adaptation code blocks #1 in the plurality of rate adaptation code blocks #1.

For example, the first bandwidth is less than or equal to a first threshold.

For example, the rate adaptation code block #1 includes first indication information, and the first indication information indicates a next rate adaptation code block adjacent to the rate adaptation code block #1.

Optionally, the first indication information indicates a quantity K of data code blocks #1 between the two rate adaptation code blocks #1, and K is a positive integer.

Optionally, a value of K may be adjusted based on a watermark value of a mapping cache, where the watermark value identifies a quantity of occupied storage units in the mapping cache. For example, if the watermark value is increased, K is increased, in other words, an insertion frequency of a rate adaptation code is decreased. For another example, if the watermark value is decreased, K is decreased, in other words, an insertion frequency of a rate adaptation code is increased.

In a possible implementation, in the first processing manner, information included in the rate adaptation code block #1 is shown in FIG. 7. FIG. 7 is a schematic diagram of a rate adaptation code block #1 according to an embodiment of this application.

It can be learned from FIG. 7 that, in the first processing manner, the rate adaptation code block #1 includes the following information: a fixed pattern (Idle Fixed Pattern, IFP) of the rate adaptation code block, a sequence number (Idle Sequence, ISQ) of the rate adaptation code block, a position of a next rate adaptation code block (Next Idle Position, NIP), ~NIP, and NIP^0xef31. The IFP indicates a fixed pattern of the rate adaptation code block #1, the ISQ indicates a sequence number of the rate adaptation code block #1, and the NIP, ~NIP, and NIP^0xef31 (for example, the first indication information shown above) indicate a position of a next rate adaptation code block #1.

For example, when the first bit width is 16 bytes, the IFP occupies 6 bytes, the ISQ occupies 4 bytes, the NIP occupies 2 bytes, ~NIP occupies 2 bytes, and NIP^0xef31 occupies 2 bytes.

It should be noted that, when the first bit width is another value (for example, 32 bytes or 64 bytes), a quantity of bytes occupied by the information included in the rate adaptation code block #1 may alternatively be another value. Examples are not described one by one herein. Usually, the rate adaptation code block #1 is of the size of the first bit width.

S730: Insert an overhead code block #1 into the first bitstream to obtain a first sub-data stream of the first bandwidth.

Specifically, the overhead code block #1 is inserted at a fixed interval X (where for example, there are X code blocks between two adjacent overhead code blocks #1) into the first bitstream obtained through rate matching in step S720, as shown in (c) in FIG. 6.

For example, a value of X includes an integer multiple of 119 or an integer multiple of 64. For example, the value of X may be 119, or the value of X may be 128.

It should be noted that the 1st overhead code block may be inserted at a random position.

For example, when at least one rate adaptation code block #1 exists between a first overhead code block #1 and a second overhead code block #1, the first overhead code block #1 includes second indication information. The second indication information indicates a position of the 1st rate adaptation code block #1 in the at least one rate adaptation code block #1 relative to the first overhead code block #1. The first overhead code block #1 and the second overhead code block #1 are two adjacent overhead code blocks #1.

For example, when the service data includes a data structure of a fixed length, and at least one boundary of the data structure exists between the first overhead code block #1 and the second overhead code block #1, the first overhead code block #1 includes third indication information. The third indication information indicates a position of a 1st boundary in the at least one boundary relative to the first overhead code block #1. The first overhead code block #1 and the second overhead code block #1 are two adjacent overhead code blocks #1.

For ease of understanding, the second indication information and the third indication information in the overhead code block #1 are briefly described with reference to (a) and (b) in FIG. 8. (a) and (b) in FIG. 8 are schematic diagrams of an indication function of the overhead code block #1 according to an embodiment of this application.

It can be learned from (a) in FIG. 8 that there are two rate adaptation code blocks #1 (for example, a rate adaptation code block #11 and a rate adaptation code block #12 shown in (a) in FIG. 8) between two adjacent overhead code blocks #1 (for example, an overhead code block #11 and an overhead code block #12 shown in (a) in FIG. 8). The overhead code block #11 includes second indication information (for example, information #1 shown in (a) in FIG. 8), and the second indication information indicates a quantity of code blocks between the rate adaptation code block #11 and the overhead code block #11.

It can be learned from (b) in FIG. 8 that there are two boundaries of a data structure of a fixed length (for example, a boundary #1 and a boundary #2 shown in (b) in FIG. 8) between two adjacent overhead code blocks #1 (for example, an overhead code block #11 and an overhead code block #12 shown in (b) in FIG. 8). The data structure of the fixed length may be three data code blocks in a cycle (where for example, a code block #1 to a code block #3 are one data structure of a fixed length, a code block #4 to a code block #6 are another data structure of a fixed length, and the rest is deduced by analogy). The overhead code block #11 includes third indication information (for example, information #2 shown in (b) in FIG. 8), and the third indication information indicates a quantity of code blocks between the code block #1 and the overhead code block #11.

In a possible implementation, in the first processing manner, information included in the overhead code block #1 is shown in FIG. 9. FIG. 9 is a schematic diagram of an overhead code block #1 according to an embodiment of this application.

It can be learned from FIG. 9 that, the overhead code block #1 in the first processing manner includes the following information: a multiframe alignment signal (MFAS), a rate adaptation code block indication (Idle pointer, I-PTR), path monitoring (PM), TCM1, TCM2, a PT, a client structure indication (client structure pointer, C-PTR), a timeslot identifier (TSI), and a multiplex structure identifier (MSI). The MFAS is a multiframe indication. Specifically, N data frames form a multiframe, and each frame carries a number: 0 to N−1. The number is understood as a multiframe alignment signal. The I-PTR may indicate a position of the rate adaptation code block #1. When there is at least one rate adaptation code block between the current overhead code block #1 and an adjacent overhead code block #1, the I-PTR may indicate a quantity of code blocks between the 1$^{st}$ rate adaptation code block #1 in the at least one rate adaptation code block #1 and the current overhead code block #1 (for example, the foregoing second indication information). When there is no rate adaptation code block #1 between the current overhead code block #1 and an adjacent overhead code block #1, the I-PTR may be filled with 0 or another agreed value. The PM, TCM1, and TCM2 indicate section monitoring overheads. Specifically, for definitions of the PM, TCM1, and TCM2, refer to definitions of the PM, TCM1, and TCM2 in the OTN frame in a current protocol, and details are not described herein again. The PT indicates a payload type. The C-PTR indicates a position of a payload structure. The TSI is timeslot information. The MSI is a timeslot-based multiplexing overhead, is transmitted in a multiframe, and indicates a relationship between a timeslot and a service, for example, specific timeslots occupied by specific services.

For example, when the first bit width is 16 bytes, the MFAS occupies 1 byte, the I-PTR occupies 1 byte, the PM occupies 3 bytes, TCM1 occupies 3 bytes, TCM2 occupies 3 bytes, the PT occupies 1 byte, the C-PTR occupies 1 byte, the TSI occupies 2 bytes, and the MSI occupies 1 byte.

It should be noted that, when the first bit width is another value (for example, 32 bytes or 64 bytes), a quantity of bytes occupied by the information included in the overhead code block #1 may alternatively be another value. Examples are not described one by one herein. Usually, the overhead code block #1 is of the size of the first bit width.

Further, timeslot-based multiplexing is performed, based on a timeslot occupation configuration table, on a plurality of first sub-data streams that are processed in the foregoing steps S710 to S730, to obtain the first data stream. A method procedure shown in FIG. 5 further includes the following step. S740: Multiplex the plurality of first sub-data streams based on a timeslot, to obtain the first data stream.

It should be understood that the plurality of first sub-data streams may be obtained after a plurality of pieces of service data whose bandwidth is less than the first threshold are separately processed in the foregoing steps S710 to S730, as shown in (d) in FIG. 6.

It can be learned from (d) in FIG. 6 that, in a unit of a code block (including the data code block #1, the rate adaptation code block #1, and the overhead code block #1), M code blocks constitute the first data stream, a bandwidth of the first data stream is the first bandwidth, and a piece of service data may occupy one or more code blocks. An allocation rule of code blocks in the first data stream is not limited in embodiments of this application.

To enable the first data stream to serve as an input of second timeslot-based multiplexing, bit width conversion needs to be performed on the first data stream. The method procedure shown in FIG. 5 further includes the following step. S750: Convert the first data stream into a second data stream of a second bit width.

Specifically, the second bit width is an integer multiple of the first bit width.

A bit width conversion process may be understood as follows: After service data of a small bit width is accumulated into service data corresponding to a large bit width, the service data is output once, and the process is repeated. Accumulation of service data of a small bit width may be understood as that a plurality of pieces of service data whose bit width is a small bit width are aggregated together until a bit width reaches a size of a large bit width, and a data stream of a large bit width is output. For example, the first bit width is 16 bytes, and the second bit width is 192 bytes. The converting the first data stream into a second data stream of a second bit width may be understood as: aggregating 12 first data streams of the first bit width to obtain the second data stream whose bit width is the second bit width.

It should be noted that a quantity of code blocks included in the first data stream and a quantity of code blocks included in the second data stream may be the same. A size of the code block in the first data stream is the first bit width, and a size of the code block in the second data stream is the second bit width. For example, the second bit width is greater than or equal to 128 bytes. For example, the second bit width is equal to 128 bytes.

Further, the second timeslot-based multiplexing can be performed after the second data stream is obtained. The method procedure shown in FIG. 5 further includes the following step. S760: Insert a rate adaptation code block #2 into the second data stream based on a second bandwidth, to perform rate matching to obtain a second bitstream.

For details, refer to the descriptions of S720. However, the bandwidth is not the first bandwidth but the second bandwidth.

In a possible implementation, in the first processing manner, information included in the rate adaptation code block #2 is shown in FIG. 10. FIG. 10 is a schematic diagram of a rate adaptation code block #2 according to an embodiment of this application.

It can be learned from FIG. 12 that, in the first processing manner, the rate adaptation code block #2 includes the following information: an IFP, an ISQ, a NIP, ~NIP, NIP^0xef31, and ALL0x55. The IFP indicates a fixed pattern of the rate adaptation code block #2, the ISQ indicates a sequence number of the rate adaptation code block #2, and the NIP, ~NIP, and NIP^0xef31 (for example, the first indication information shown above) indicate a position of a next rate adaptation code block #2.

For example, when the second bit width is 192 bytes, the IFP occupies 6 bytes, the ISQ occupies 4 bytes, the NIP occupies 2 bytes, ~NIP occupies 2 bytes, NIP^0xef31 occupies 2 bytes, and ALL0x55 occupies 176 bytes.

It should be noted that, when the second bit width is another value (for example, 128 bytes or 240 bytes), a quantity of bytes occupied by the information included in the rate adaptation code block #2 may alternatively be another value. Examples are not described one by one herein. Usually, the rate adaptation code block #2 is of the size of the second bit width.

S770: Insert an overhead code block #2 into the second bitstream to obtain a second sub-data stream of the second bandwidth.

Specifically, the overhead code block #2 is inserted at a fixed interval X (where for example, there are X code blocks between two adjacent overhead code blocks #2) into the second bitstream obtained through rate matching in step S770.

For details, refer to the descriptions of S730. Details are not described herein again.

In a possible implementation, in the first processing manner, information included in the overhead code block #2 is shown in FIG. 11. FIG. 11 is a schematic diagram of an overhead code block #2 according to an embodiment of this application.

It can be learned from FIG. 11 that in the first processing manner, the overhead code block #2 includes the following information: an MFAS, an I-PTR, PM, TCM1, TCM2, a PT, a C-PTR, a TSI, an MSI, and RES. The MFAS is a multiframe indication. The I-PTR may indicate a position of the rate adaptation code block #2. When there is at least one rate adaptation code block between the current overhead code block #2 and an adjacent overhead code block #2, the I-PTR may indicate a quantity of code blocks between the $1^{st}$ rate adaptation code block #2 in the at least one rate adaptation code block #2 and the current overhead code block #2 (for example, the foregoing second indication information). When there is no rate adaptation code block #2 between the current overhead code block #2 and an adjacent overhead code block #2, the I-PTR may be filled with 0 or another agreed value. The PM, TCM1, and TCM2 indicate section monitoring overheads. The PT indicates a payload type. The C-PTR indicates a position of a payload structure. The TSI is timeslot information. The MSI is a timeslot-based multiplexing overhead and is transmitted in a multiframe.

For example, when the second bit width is 192 bytes, the MFAS occupies 1 byte, the I-PTR occupies 1 byte, the PM occupies 3 bytes, TCM1 occupies 3 bytes, TCM2 occupies 3 bytes, the PT occupies 1 byte, the C-PTR occupies 1 byte, the TSI occupies 2 bytes, the MSI occupies 128 bytes, and RES occupies 128 bytes.

It should be noted that, when the second bit width is another value (for example, 128 bytes or 240 bytes), a quantity of bytes occupied by the information included in the overhead code block #2 may alternatively be another value. Examples are not described one by one herein. Usually, the overhead code block #2 is of the size of the second bit width.

Further, timeslot-based multiplexing is performed on a plurality of sub-data streams of the second bandwidth based on a timeslot occupation configuration table, to obtain an intermediate frame. The method procedure shown in FIG. 5 further includes the following step. S780: Perform timeslot-based multiplexing based on the second sub-data stream, to obtain the intermediate frame.

Specifically, timeslot-based multiplexing is performed on the second sub-data stream and other data streams of the second bandwidth to obtain the intermediate frame.

It should be noted that the other data streams of the second bandwidth may be obtained by processing the service data whose bandwidth is less than the first threshold in the foregoing steps S710 to S780. Alternatively, the other data streams of the second bandwidth may be obtained by processing the service data whose bandwidth is not less than the first threshold in a processing procedure shown in FIG. 12 below.

Specifically, the intermediate frame (after the two-level timeslot-based multiplexing) includes N code blocks of the size of the second bit width, and the first data stream (after the first timeslot-based multiplexing) includes M code blocks of the size of the first bit width, where N is a positive integer, and M is an integer multiple of N.

In a possible implementation, M=12*N, and a value of N is determined by server-layer ODUk. Assuming that the first bandwidth=120 M; for ODU0, N=1.25 G/120 M≈10; for ODU1, N=(2*1.25 G)/120 M≈2*10; for ODUflex3, N=(3*1.25 G)/120 M≈3*10; . . . ; and the rest is deduced by analogy.

In another possible implementation, M=15*N, and a value of N is determined by server-layer ODUk. Assuming that the first bandwidth=150 M; for ODU0, N=1.25 G/150 M≈8; for ODU1, N=(2*1.25 G)/150 M≈2*8; for ODUflex3, N=(3*1.25 G)/150 M≈3*8; . . . ; and the rest is deduced by analogy.

The following describes in detail a processing procedure of a second processing manner with reference to FIG. 12. FIG. 12 is a schematic flowchart of the second processing manner according to this application. The second processing manner includes the following steps.

S1410: A transmitting end device divides service data into one or more data code blocks #3 based on a second bit width.

Specifically, the service data is sliced into the one or more data code blocks #3 of a size of the second bit width. For details, refer to the descriptions of S710. However, a division object is service data whose bandwidth is not less than a first threshold, and a size for the division is the second bit width.

S1420: Insert a rate adaptation code block #3 into a plurality of data code blocks #3 based on a second bandwidth, to perform rate matching to obtain a third bitstream.

Specifically, when the service data is sliced into the plurality of data code blocks #3 of the size of the second bit width, the rate adaptation code block #3 is inserted into the plurality of data code blocks #3 to implement rate matching. For details, refer to the descriptions of S760. Details are not described herein again. For a specific structure of the rate adaptation code block #3, refer to FIG. 10. Details are not described herein again.

S1430: Insert an overhead code block #3 into the third bitstream to obtain a third sub-data stream of the second bandwidth.

Specifically, the overhead code block #3 is inserted at a fixed interval X (where for example, there are X code blocks between two adjacent overhead code blocks #3) into the third bitstream obtained through rate matching in step 1420. For details, refer to the descriptions of S770. Details are not described herein again. For a specific structure of the overhead code block #3, refer to FIG. 11. Details are not described herein again.

Further, timeslot-based multiplexing is performed on a plurality of sub-data streams of the second bandwidth based on a timeslot occupation configuration table, to obtain an intermediate frame. A method procedure shown in FIG. 12 further includes the following step. S1440: Perform timeslot-based multiplexing based on the third sub-data stream, to obtain the intermediate frame.

Specifically, timeslot-based multiplexing is performed on the third sub-data stream and other data streams of the second bandwidth to obtain the intermediate frame.

It should be noted that the other data streams of the second bandwidth may be obtained by processing the service data whose bandwidth is less than the first threshold in steps S710 to S770, or may be obtained by processing the service data whose bandwidth is not less than the first threshold in steps S1410 to S1440.

Figure 5:
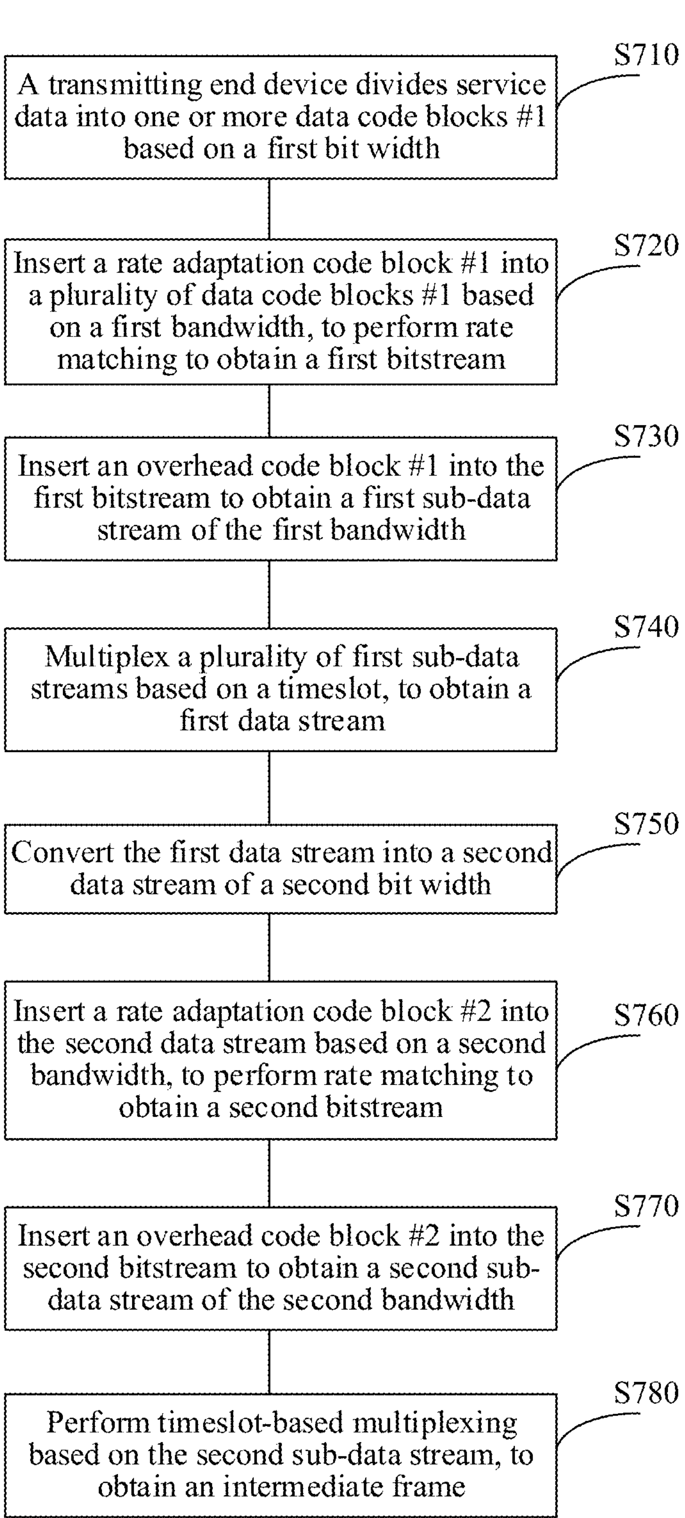
FIG. 5 is a schematic flowchart of processing service data to a first sub-data stream according to an embodiment of this application.

FIG. 5 and FIG. 12 respectively describe the manner of processing the service data whose bandwidth is less than the first threshold and the manner of processing the service data whose bandwidth is not less than the first threshold. It may be understood that service data may be further classified into a plurality of types (for example, small-bandwidth service data, medium-bandwidth service data, and large-bandwidth service data) by using a plurality of threshold limits. Three-level timeslot-based multiplexing processing is performed on the small-bandwidth service data, two-level timeslot-based multiplexing processing is performed on the medium-bandwidth service data (for example, the method procedure shown in FIG. 5), and single-level timeslot-based multiplexing processing is performed on the large-bandwidth service data (for example, the method procedure shown in FIG. 12). The three-level timeslot-based multiplexing processing is sequentially performing timeslot-based multiplexing based on three types of bit widths and bandwidths that are of different sizes. For a processing procedure, refer to the two-level timeslot-based multiplexing processing shown in FIG. 5. Details are not described herein again.

In addition, it may be understood that, when receiving both the service data whose bandwidth is less than the first threshold and the service data whose bandwidth is not less than the first threshold, the receiving end device may separately process the two types of service data. In other words, the method procedures shown in FIG. 5 and FIG. 12 may be used in combination. FIG. 13 is a schematic flowchart of another type of service data processing according to an embodiment of this application.

It can be learned from FIG. 13 that service data of different bandwidths may be processed through different processing procedures.

Rate matching, O code insertion, timeslot-based multiplexing (for example, timeslot-based multiplexing before bit width conversion shown in FIG. 13), and bit width conversion are performed respectively on a plurality of pieces of service data whose bandwidth is less than the first threshold, to obtain a data stream. Rate matching and O code insertion are further performed on the data stream, to obtain a data stream. Timeslot-based multiplexing (for example, timeslot-based multiplexing after the bit width conversion shown in FIG. 13) is performed on the data stream and a data stream obtained by performing rate matching and O code insertion on at least one piece of service data whose bandwidth is not less than the first threshold, to obtain an intermediate frame. O code insertion is performed on the intermediate frame to perform ODU encapsulation. For O code insertion and ODU encapsulation on the intermediate frame, refer to processing of service data encapsulation in service data transmission in an OTN network in a current related technology. Details are not described herein again.

It should be understood that the specific examples shown in FIG. 4 to FIG. 13 in embodiments of this application are merely intended to help a person skilled in the art better understand embodiments of this application, but are not intended to limit the scope of embodiments of this application. It should be further understood that sequence numbers of the processes do not mean execution sequences. The execution sequences of the foregoing processes should be determined based on functions and internal logic of the processes, and should not be construed as any limitation on implementation processes of embodiments of this application.

It should be further understood that in embodiments of this application, unless otherwise stated or there is a logic conflict, terms and/or descriptions in different embodiments are consistent and may be mutually referenced, and technical features in different embodiments may be combined based on an internal logical relationship thereof, to form a new embodiment.

It should be further understood that, in some of the foregoing embodiments, a device (for example, an OTN device) in an existing network architecture is mainly used as an example for description. It should be understood that a specific form of the device is not limited in embodiments of this application. For example, all devices that can implement a same function in the future are applicable to embodiments of this application.

It may be understood that, in the foregoing method embodiments, methods and operations implemented by a device (for example, a receiving end device and a transmitting end device) may also be implemented by a component (for example, a chip or a circuit) that can be used in the device.

The service data processing method provided in embodiments of this application is described above in detail with reference to FIG. 4 to FIG. 13. The foregoing service data processing method is mainly described from a perspective of interaction between the receiving end device and the transmitting end device. It may be understood that, to implement the foregoing functions, the receiving end device and the transmitting end device include corresponding hardware structures and/or software modules for performing the functions.

A person skilled in the art may be aware that, with reference to the examples described in embodiments disclosed in this specification, units and algorithm steps can be implemented by hardware or a combination of hardware and computer software in this application. Whether a function is performed by hardware or hardware driven by computer software depends on particular applications and design constraint conditions of the technical solutions. A professional technician may use different methods to implement the described functions for each particular application, but it should not be considered that the implementation goes beyond the scope of this application.

The following describes in detail a communication apparatus provided in embodiments of this application with reference to FIG. 14. It should be understood that descriptions of an apparatus embodiment correspond to the descriptions of the method embodiments. Therefore, for content that is not described in detail, refer to the foregoing method embodiments. For brevity, some content is not described again.

In embodiments of this application, the receiving end device and the transmitting end device may be divided into functional modules based on the foregoing method examples. For example, each functional module may be obtained through division based on each function, or two or more functions may be integrated into one processing module. The integrated module may be implemented in a form of hardware, or may be implemented in a form of a software functional module. It should be noted that module division in embodiments of this application is an example, and is merely logical function division. During actual implementation, there may be another division manner. An example in which each functional module is obtained through division based on each corresponding function is used below for description.

FIG. 14 is a schematic diagram of a structure of a possible network device. As shown in FIG. 14, a network device 1600 includes a processor 1601, an optical transceiver 1602, and a memory 1603. The memory 1603 is optional. The network device 1600 may be used in a transmitting side device (where for example, the network device 1600 may be the foregoing transmitting end device) or a receiving side device (where for example, the network device 1600 may be the foregoing receiving end device).

When the network device 1600 is used in the transmitting side device, the processor 1601 and the optical transceiver 1602 are configured to implement the method performed by the transmitting end device shown in FIG. 4, FIG. 5, or FIG. 12. In an implementation process, steps of a processing procedure may implement the method performed by the transmitting end device in the foregoing drawings by using a hardware integrated logical circuit or instructions in a form of software in the processor 1601. The optical transceiver 1602 is configured to receive and process a sent OTN frame, and send the OTN frame to a peer device (also referred to as a receiving end device).

When the network device 1600 is used in the receiving side device, the processor 1601 and the optical transceiver 1602 are configured to implement the method performed by the receiving end device shown in FIG. 4. In an implementation process, steps of a processing procedure may implement the method performed by the receiving end device in the foregoing drawings by using a hardware integrated logical circuit or instructions in a form of software in the processor 1601. The optical transceiver 1602 is configured to receive an OTN frame sent by a peer device (also referred to as a transmitting end device), to send the OTN frame to the processor 1601, so that the processor 1601 performs subsequent processing.

The memory 1603 may be configured to store instructions, so that the processing 1601 may be configured to perform the steps mentioned in the foregoing figures. Alternatively, the storage 1603 may be configured to store other instructions to configure a parameter of the processor 1601, to implement a corresponding function.

It should be noted that, in a network device hardware structural diagram shown in FIG. 2, the processor 1601 and the memory 1603 may be located in a tributary board, or may be located in a tributary-line integrated board. Alternatively, there are a plurality of processors 1601 and a plurality of memories 1603, which are respectively located on a tributary board and a line board. The two boards cooperate to complete the foregoing method steps.

It should be noted that the apparatus in FIG. 14 may also be configured to perform the method steps in variations of embodiments shown in the foregoing accompanying drawings. Details are not described herein again.

Based on the foregoing embodiments, an embodiment of this application further provides a computer-readable storage medium. The storage medium stores a software program. When the software program is read and executed by one or more processors, the method provided in any one or more of the foregoing embodiments may be implemented. The computer-readable storage medium may include any medium that can store program code, for example, a USB flash drive, a removable hard disk, a read-only memory, a random access memory, a magnetic disk, or an optical disc.

Based on the foregoing embodiments, an embodiment of this application further provides a chip. The chip includes a processor, configured to implement functions in any one or more of the foregoing embodiments, for example, obtaining or processing the OTN frame in the foregoing method. Optionally, the chip further includes a memory, and the memory is used by the processor to execute necessary program instructions and data. The chip may include a chip, or may include a chip and another discrete component.

This application is described with reference to the flowcharts and/or block diagrams of the method, the device (system), and the computer program product according to embodiments of this application. It should be understood that computer program instructions may be used to implement each procedure and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more procedures in the flowcharts and/or in one or more blocks in the block diagrams.

The computer program instructions may be stored in a computer-readable memory that can indicate the computer or any other programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

The computer program instructions may alternatively be loaded onto a computer or another programmable data processing device, so that a series of operations and steps are performed on the computer or another programmable device, to generate computer-implemented processing. Therefore, the instructions executed on the computer or the another programmable device provide steps for implementing a specific function in one or more procedures in the flowcharts and/or in one or more blocks in the block diagrams.

It is clear that a person skilled in the art can make various modifications and variations to embodiments of this application without departing from the scope of embodiments of this application. This application is intended to cover these modifications and variations provided that they fall within the scope of protection defined by the following claims and their equivalent technologies.

It should be understood that, the processor mentioned in embodiments of this application may be a central processing unit (CPU), or may be another general-purpose processor, a digital signal processor (DSP), an application specific integrated circuit (ASIC), a field programmable gate array (FPGA), or another programmable logic device, discrete gate or transistor logic device, discrete hardware component, or the like. The general-purpose processor may be a microprocessor, or the processor may be any conventional processor, or the like.

It should be further understood that the memory in embodiments of this application may be a volatile memory and/or a nonvolatile memory. The nonvolatile memory may be a read-only memory (ROM), a programmable read-only memory (programmable ROM, PROM), an erasable programmable read-only memory (EPROM), an electrically erasable programmable read-only memory (EEPROM), or a flash memory. The volatile memory may be a random access memory (random access memory, RAM). For example, the RAM may be used as an external cache. By way of example and not limitation, the RAM may include the following forms: a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be noted that when the processor is a general-purpose processor, a DSP, an ASIC, an FPGA or another programmable logic device, a discrete gate, a transistor logic device, or a discrete hardware component, the memory (a storage module) may be integrated into the processor.

A person of ordinary skill in the art may be aware that, in combination with the examples described in embodiments disclosed in this specification, units and steps may be implemented by electronic hardware or a combination of computer software and electronic hardware. Whether the functions are performed by hardware or software depends on particular applications and design constraint conditions of the technical solutions. A professional technician may use different methods to implement the described functions for each particular application, but it should not be considered that the implementation goes beyond the protection scope of this application.

In the several embodiments provided in this application, it should be understood that the disclosed apparatus and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatus or units may be implemented in electronic, mechanical, or another form.

The units described as separate parts may or may not be physically separate, and parts displayed as units may or may not be physical units, in other words, the parts may be located in one position, or may be distributed on a plurality of network units. Some or all of the units may be selected based on actual requirements, to implement the solutions of embodiments.

In addition, functional units in embodiments of this application may be integrated into one unit, or each of the units may exist alone physically, or two or more units are integrated into one unit.

All or a part of the foregoing embodiments may be implemented by using software, hardware, firmware, or any combination thereof. When the software is used to implement the embodiments, all or a part of the embodiments may be implemented in a form of a computer program product. The computer program product includes one or more computer instructions. When the computer program instructions are loaded and executed on a computer, the procedure or functions according to embodiments of this application are all or partially generated. The computer may be a general-purpose computer, a dedicated computer, a computer network, or another programmable apparatus. For example, the computer may be a personal computer, a server, or a network device. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device such as a server or a data center, integrating one or more usable media. The usable medium may be a magnetic medium (for example, a floppy disk, a hard disk, and a magnetic tape), an optical medium (for example, a DVD), a semiconductor medium (for example, a solid state disk (solid state disk, SSD)), or the like. For example, the usable medium may include but is not limited to any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application. However, the protection scope of this application is not limited thereto. Any change or replacement readily figured out by a person skilled in the art within the technical scope disclosed in this application shall fall within the protection scope of this application. Therefore, the protection scope of this application shall be subject to the protection scope of the claims.

What is claimed is:

1. A service data processing method, comprising:

receiving service data;

performing a first processing manner or a second processing manner on the service data based on a bandwidth of the service data and a first threshold, to obtain an intermediate frame that carries the service data;

mapping the intermediate frame to an optical transport network (OTN) frame; and sending the OTN frame; wherein:

when the bandwidth of the service data is less than the first threshold, the first processing manner is performed, the first processing manner comprising:

performing first timeslot-based multiplexing on the service data based on a first bit width and a first bandwidth, to obtain a first data stream of the first bit width, converting the first data stream into a second data stream of a second bit width, performing second timeslot-based multiplexing on the second data stream based on the second bit width and a second bandwidth, to obtain the intermediate frame;

when the bandwidth of the service data is not less than the first threshold, the second processing manner is performed, the second processing manner comprising:

performing single-level timeslot-based multiplexing on the service data based on the second bit width and the second bandwidth, to obtain the intermediate frame; and wherein the first threshold is greater than or equal to 50 megabits per second (Mbps) and less than or equal to 200 Mbps, the second bit width is an integer multiple of the first bit width, and the second bandwidth is an integer multiple of the first bandwidth.

2. The method of claim 1, wherein the first bandwidth is less than the first threshold, and the second bandwidth is greater than or equal to the first threshold.

3. The method of claim 1, wherein the first bit width is greater than or equal to 16 bytes and less than or equal to 64 bytes, and the second bit width is greater than or equal to 128 bytes.

4. The method of claim 1, wherein when the bandwidth of the service data is less than the first threshold, the performing timeslot-based multiplexing on the service data based on the first bit width and the first bandwidth, to obtain the first data stream of the first bit width comprises:

dividing the service data into one or more data code blocks based on the first bit width;

inserting a rate adaptation code block into a plurality of data code blocks based on the first bandwidth, to perform rate matching to obtain a first bitstream;

inserting an overhead code block into the first bitstream, to obtain a first sub-data stream of the first bandwidth, wherein two adjacent overhead code blocks are separated by X code blocks; and multiplexing a plurality of first sub-data streams based on a timeslot, to obtain the first data stream, wherein X is a positive integer, and sizes of the data code block, the rate adaptation code block, and the overhead code block are the first bit width.

5. The method of claim 1, wherein when the bandwidth of the service data is less than the first threshold, the performing timeslot-based multiplexing on the second data stream based on the second bit width and the second bandwidth, to obtain the intermediate frame comprises:

inserting a rate adaptation code block into the second data stream based on the second bandwidth, to perform rate matching to obtain a second bitstream;

inserting an overhead code block into the second bitstream, to obtain a second sub-data stream of the second bandwidth, wherein two adjacent overhead code blocks are separated by X code blocks; and performing timeslot-based multiplexing based on the second sub-data stream, to obtain the intermediate frame, wherein X is a positive integer, and sizes of the data code block, the rate adaptation code block, and the overhead code block are the second bit width.

6. The method of claim 1, wherein when the bandwidth of the service data is not less than the first threshold, the performing timeslot-based multiplexing on the service data based on the second bit width and the second bandwidth, to obtain the intermediate frame comprises:

dividing the service data into one or more data code blocks based on the second bit width;

inserting a rate adaptation code block into a plurality of data code blocks based on the second bandwidth, to perform rate matching to obtain a third bitstream;

inserting an overhead code block into the third bitstream, to obtain a third sub-data stream of the second bandwidth, wherein two adjacent overhead code blocks are separated by X code blocks; and performing timeslot-based multiplexing based on the third sub-data stream, to obtain the intermediate frame, wherein X is a positive integer, and sizes of the data code block, the rate adaptation code block, and the overhead code block are the second bit width.

7. The method of claim 4, wherein a value of X comprises an integer multiple of 119 or an integer multiple of 64.

8. The method of claim 4, wherein the rate adaptation code block comprises first indication information, and the first indication information indicates a next rate adaptation code block adjacent to the rate adaptation code block.

9. The method of claim 8, wherein the first indication information indicates a quantity K of data code blocks between the two rate adaptation code blocks, and K is a positive integer.

10. The method of claim 9, the method further comprising:

adjusting a value of K based on a watermark value of a mapping cache, wherein the watermark value identifies a quantity of occupied storage units in the mapping cache.

11. The method of claim 4, wherein when at least one rate adaptation code block exists between a first overhead code block and a second overhead code block, the first overhead code block comprises second indication information, the second indication information indicates a position of a $1^{st}$ rate adaptation code block in the at least one rate adaptation code block relative to the first overhead code block, and the first overhead code block and the second overhead code block are two adjacent overhead code blocks.

12. The method of claim 4, wherein when the service data comprises a data structure of a fixed length, and at least one boundary of the data structure exists between the first overhead code block and the second overhead code block, the first overhead code block comprises third indication information, the third indication information indicates a position of a $1^{st}$ boundary in the at least one boundary relative to the first overhead code block, and the first overhead code block and the second overhead code block are two adjacent overhead code blocks.

13. The method of claim 1, the method further comprising:

determining the first processing manner or the second processing manner for processing the service data in accordance with at least one of the following:

fourth indication information indicating the first processing manner or the second processing manner; or a determining result as to whether the bandwidth of the service data is less than the first threshold.

14. The method of claim 1, wherein the first data stream comprises M code blocks of a size of the first bit width, the intermediate frame comprises N code blocks of a size of the second bit width, N is a positive integer, and M is an integer multiple of N.

15. A service data processing method, comprising:

receiving an optical transport network (OTN) frame that is mapped with an intermediate frame carrying at least one of first service data or second service data, wherein the first service data has a bandwidth less than a first threshold, and the second service data has a bandwidth not less than the first threshold, the first threshold is greater than or equal to 50 megabits per second (Mbps) and less than or equal to 200 Mbps, wherein the first service data is timeslot-based multiplexed in the intermedia frame by a first timeslot-based multiplexing and a second timeslot-based multiplexing, the second service data is single-level timeslot-based multiplexed in the intermedia frame by the second timeslot-based multiplexing, the first timeslot-based multiplexing has a first bit width and a first bandwidth, and the second timeslot-based multiplexing has a second bitwidth and a second bandwidth, the second bit width is an integer multiple of the first bit width, and the second bandwidth is an integer multiple of the first bandwidth;

recovering the intermediate frame from the OTN frame;

obtaining the at least one of the first service data or the second service data from the intermediate frame.

16. A service data processing apparatus, comprising:

a processor, and a non-transitory memory storing programing instructions that, when executed by the processor, cause the service data processing apparatus to perform:

receiving service data;

performing a first processing manner or a second processing manner on the service data based on a bandwidth of the service data and a first threshold, to obtain an intermediate frame that carries the service data;

mapping the intermediate frame to an optical transport network (OTN) frame; and sending the OTN frame; wherein:

when the bandwidth of the service data is less than the first threshold, the first processing manner is performed, the first processing manner comprising:

performing first timeslot-based multiplexing on the service data based on a first bit width and a first bandwidth, to obtain a first data stream of the first bit width, converting the first data stream into a second data stream of a second bit width, performing second timeslot-based multiplexing on the second data stream based on the second bit width and a second bandwidth, to obtain the intermediate frame;

when the bandwidth of the service data is not less than the first threshold, the second processing manner is performed, the second processing manner comprising:

performing single-level timeslot-based multiplexing on the service data based on the second bit width and the second bandwidth, to obtain the intermediate frame; and wherein the first threshold is greater than or equal to 50 megabits per second (Mbps) and less than or equal to 200 Mbps, the second bit width is an integer multiple of the first bit width, and the second bandwidth is an integer multiple of the first bandwidth.

17. The apparatus of claim 16, wherein the first bandwidth is less than the first threshold, and the second bandwidth is greater than or equal to the first threshold.

18. The apparatus of claim 16, wherein the first bit width is greater than or equal to 16 bytes and less than or equal to 64 bytes, and the second bit width is greater than or equal to 128 bytes.

19. The apparatus of claim 16, wherein when the bandwidth of the service data is less than the first threshold, the performing timeslot-based multiplexing on the service data based on the first bit width and the first bandwidth, to obtain the first data stream of the first bit width comprises:

dividing the service data into one or more data code blocks based on the first bit width;

inserting a rate adaptation code block into a plurality of data code blocks based on the first bandwidth, to perform rate matching to obtain a first bitstream;

inserting an overhead code block into the first bitstream, to obtain a first sub-data stream of the first bandwidth, wherein two adjacent overhead code blocks are separated by X code blocks; and multiplexing a plurality of first sub-data streams based on a timeslot, to obtain the first data stream, wherein X is a positive integer, and sizes of the data code block, the rate adaptation code block, and the overhead code block are the first bit width.

20. The apparatus of claim 16, wherein when the bandwidth of the service data is less than the first threshold, the performing timeslot-based multiplexing on the second data stream based on the second bit width and the second bandwidth, to obtain the intermediate frame comprises:

inserting a rate adaptation code block into the second data stream based on the second bandwidth, to perform rate matching to obtain a second bitstream;

inserting an overhead code block into the second bitstream, to obtain a second sub-data stream of the second bandwidth, wherein two adjacent overhead code blocks are separated by X code blocks; and performing timeslot-based multiplexing based on the second sub-data stream, to obtain the intermediate frame, wherein X is a positive integer, and sizes of the data code block, the rate adaptation code block, and the overhead code block are the second bit width.

* * * * *